US010993183B2

(12) United States Patent
Islam et al.

(10) Patent No.: US 10,993,183 B2
(45) Date of Patent: Apr. 27, 2021

(54) WAKE UP PROCEDURE USING PSEUDO-OMNI BEAM

(71) Applicant: QUALCOMM Incorporated, San Diego, CA (US)

(72) Inventors: Muhammad Nazmul Islam, Edison, NJ (US); Jianghong Luo, Skillman, NJ (US); Sumeeth Nagaraja, San Diego, CA (US); Ashwin Sampath, Skillman, NJ (US); Sundar Subramanian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 192 days.

(21) Appl. No.: 16/042,780

(22) Filed: Jul. 23, 2018

(65) Prior Publication Data
US 2019/0053162 A1 Feb. 14, 2019

Related U.S. Application Data

(60) Provisional application No. 62/544,731, filed on Aug. 11, 2017.

(51) Int. Cl.
H04W 52/02 (2009.01)
H04W 16/14 (2009.01)
(Continued)

(52) U.S. Cl.
CPC ...... H04W 52/0235 (2013.01); H04B 7/0617 (2013.01); H04B 7/0695 (2013.01);
(Continued)

(58) Field of Classification Search
CPC .. H04B 7/0617; H04B 7/0695; H04B 7/0626; H04W 16/14; H04W 16/28;
(Continued)

(56) References Cited

U.S. PATENT DOCUMENTS 10,314,007 B2 * 6/2019 Agiwal ............... H04B 7/0408
10,492,137 B2 * 11/2019 Kwon .................. H04W 24/08
(Continued)

FOREIGN PATENT DOCUMENTS

WO WO-2017066917 A1 4/2017
WO WO2017196611 A1 11/2017

OTHER PUBLICATIONS

International Search Report and Written Opinion—PCT/US2018/043428—ISA/EPO—dated Oct. 17, 2018.

Primary Examiner — Ahmed Elallam
(74) Attorney, Agent, or Firm — Linda G. Gunderson

(57) ABSTRACT

Methods, systems, and devices for wireless communication are described. A base station may identify that data is available to be transmitted to a user equipment (UE) that is operating in a discontinuous reception mode. The base station may transmit, based at least in part on identifying that the data is available to be transmitted to the UE, a wakeup message to the UE using a first transmit beam. The base station may initiate a beam management procedure based at least in part on identifying that the data is available to be transmitted to the UE, to identify a second transmit beam for the base station to use to transmit the available data to the UE, wherein the second transmit beam comprises a narrower beam width than the first transmit beam.

30 Claims, 18 Drawing Sheets

(51) Int. Cl.
*H04W 72/04* (2009.01)
*H04W 76/28* (2018.01)
*H04W 16/28* (2009.01)
*H04B 7/06* (2006.01)

(52) U.S. Cl.
CPC ........... *H04W 16/14* (2013.01); *H04W 16/28* (2013.01); *H04W 52/0216* (2013.01); *H04W 52/0229* (2013.01); *H04W 72/042* (2013.01); *H04W 76/28* (2018.02); *H04W 72/046* (2013.01)

(58) Field of Classification Search
CPC ......... H04W 52/0216; H04W 52/0229; H04W 52/0235; H04W 68/005; H04W 72/042; H04W 72/046; H04W 76/28; H04L 5/0023; H04L 5/0025; H04L 5/0051
See application file for complete search history.

(56) References Cited

U.S. PATENT DOCUMENTS

| | | | |
|---|---|---|---|
| 10,548,182 B2* | 1/2020 | Luo | H04W 72/046 |
| 10,841,970 B2* | 11/2020 | Islam | H04L 69/324 |
| 2015/0078189 A1* | 3/2015 | Kwon | H04W 24/08 370/252 |
| 2017/0064625 A1 | 3/2017 | Sampath et al. | |
| 2017/0251518 A1 | 8/2017 | Agiwal et al. | |
| 2017/0339675 A1* | 11/2017 | Liu | H04L 5/0055 |
| 2018/0006379 A1 | 1/2018 | Cariou et al. | |
| 2018/0020503 A1* | 1/2018 | Deenoo | H04W 76/28 |
| 2018/0102826 A1 | 4/2018 | Raghavan et al. | |
| 2018/0167883 A1* | 6/2018 | Guo | H04W 52/0216 |
| 2018/0288746 A1* | 10/2018 | Zhang | H04W 72/042 |
| 2019/0058518 A1* | 2/2019 | Koskela | H04W 76/28 |
| 2019/0261448 A1* | 8/2019 | Hu | H04W 52/02 |
| 2020/0036430 A1* | 1/2020 | Kim | H04L 25/0204 |
| 2020/0205076 A1* | 6/2020 | Chen | H04W 52/0229 |
| 2020/0336193 A1* | 10/2020 | Park | H04W 72/04 |

* cited by examiner

US 10,993,183 B2

WAKE UP PROCEDURE USING PSEUDO-OMNI BEAM

CROSS REFERENCES

The present application for patent claims the benefit of U.S. Provisional Patent Application No. 62/544,731 by ISLAM, et al., entitled "WAKE UP PROCEDURE USING PSEUDO-OMNI BEAM," filed Aug. 11, 2017, assigned to the assignee hereof, and expressly incorporated herein.

BACKGROUND

The following relates generally to wireless communication, and more specifically to a wake up procedure using a pseudo-omni beam.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

A UE may operate in a discontinuous reception (DRX) mode (e.g., a connected DRX (C-DRX) mode) where the UE transitions between an active state (e.g., where the UE wakes up to determine if data is available for the UE) and a sleep state (e.g., where the UE shuts down various hardware/processes to conserve power). The UE may determine if data is available by monitoring a control channel, such as a physical downlink control channel (PDCCH). The PDCCH may carry or otherwise convey an indication that the base station has data ready to transmit to the UE. In a mmW wireless communication system, the mmW base station (e.g., a next generation nodeB (gNB)) may need to beam sweep the PDCCH transmissions to mitigate high path losses associated with mmW transmissions. This may result in the UE attempting to decode the PDCCH multiple times and/or wake up for a longer time period to receive and decode the PDCCH transmissions and/or allow for beam management. Power consumption at the UE using such techniques may be high.

SUMMARY

The described techniques relate to improved methods, systems, devices, or apparatuses that support a wake up procedure using a pseudo-omni beam. Generally, the described techniques provide for a millimeter wave (mmW) base station to use a pseudo-omni beam to wake up a user equipment (UE) having available data. For example, the UE may be operating in a discontinuous reception (DRX) mode (e.g., a connected DRX (C-DRX) mode) that includes transitioning between an active state (or on mode) and a sleep state. The base station may determine that data is available for the UE and, when the UE transitions to an active state, transmit a wakeup message to the UE using a first transmit beam, e.g., a pseudo-omni transmit beam. The first transmit beam may have a broad beam width to cover a wider coverage area to improve UE reception, e.g., a wider beam width than is typically used for data communications in a mmW network, for example wider than beams used to transmit or receive data (e.g., using a PDSCH) between the UE and base station. In some examples, the wakeup signal may be a PDCCH message that is encoded with a low code rate (e.g., the lowest available code rate) to further improve UE reception. The UE may receive the wakeup message and receive a second set of signals during a beam management procedure. In some aspects, the second set of signals may be transmitted using a second set of transmit beams, e.g., reference and/or synchronization signals, from the base station. The UE may select a receive beam to use for communicating with the base station and transmit a signal, e.g., a beam recovery message, indicating the selected receive beam. The base station may select a second transmit beam to communicate the data to the UE based on the indicated receive beam.

A method of wireless communication at a base station is described. The method may include identifying that data is available to be transmitted to a UE that is operating in a DRX mode, transmitting, based on identifying that the data is available to be transmitted to the UE, a wakeup message to the UE using a first transmit beam, and initiating a beam management procedure based on identifying that the data is available to be transmitted to the UE, to identify a second transmit beam for the base station to use to transmit the available data to the UE.

An apparatus for wireless communication at a base station is described. The apparatus may include a processor, memory in electronic communication with the processor, and instructions stored in the memory. The instructions may be executable by the processor to cause the apparatus to identify that data is available to be transmitted to a UE that is operating in a DRX mode, transmit, based on identifying that the data is available to be transmitted to the UE, a wakeup message to the UE using a first transmit beam, and initiate a beam management procedure based on identifying that the data is available to be transmitted to the UE, to identify a second transmit beam for the base station to use to transmit the available data to the UE.

Another apparatus for wireless communication at a base station is described. The apparatus may include means for identifying that data is available to be transmitted to a UE that is operating in a DRX mode, transmitting, based on identifying that the data is available to be transmitted to the UE, a wakeup message to the UE using a first transmit beam, and initiating a beam management procedure based on identifying that the data is available to be transmitted to the UE, to identify a second transmit beam for the base station to use to transmit the available data to the UE.

A non-transitory computer-readable medium storing code for wireless communication at a base station is described. The code may include instructions executable by a processor to identify that data is available to be transmitted to a UE that is operating in a DRX mode, transmit, based on identifying that the data is available to be transmitted to the UE, a wakeup message to the UE using a first transmit beam, and initiate a beam management procedure based on identifying that the data is available to be transmitted to the UE, to identify a second transmit beam for the base station to use to transmit the available data to the UE.

In some examples of the method, apparatuses, and non-transitory computer-readable medium described herein, the first transmit beam includes a pseudo-omni transmit beam and the second transmit beam includes a narrower beam width than the first transmit beam.

In some examples of the method, apparatuses, and non-transitory computer-readable medium described herein, the first transmit beam and the second transmit beam may be different transmit beams.

In some examples of the method, apparatuses, and non-transitory computer-readable medium described herein, the wakeup message includes an indication that the data may be available to be transmitted to the UE, and the beam management procedure may be initiated based on the data being available.

In some examples of the method, apparatuses, and non-transitory computer-readable medium described herein, the beam management procedure includes transmitting a set of beam management transmissions to the UE using a set of transmit beams, each transmit beam of the set of transmit beams being transmitted in a different direction and having a narrower beam width than the first transmit beam.

In some examples of the method, apparatuses, and non-transitory computer-readable medium described herein, the wakeup message includes a PDCCH message having a lower code rate than a different UE-specific PDCCH message.

In some examples of the method, apparatuses, and non-transitory computer-readable medium described herein, and transmitting the wakeup message using the first transmit beam includes: transmitting, using the first transmit beam, a set of instances of the wakeup message over a set of symbol periods.

Some examples of the method, apparatuses, and non-transitory computer-readable medium described herein may further include operations, features, means, or instructions for transmitting, based on the signal, the identified data to the UE using a transmit beam identified in the signal, the transmit beam including at least one transmit beam from a set of transmit beams transmitted to the UE in different directions during the beam management procedure, the transmit beam having a narrower beam width than the first transmit beam.

Some examples of the method, apparatuses, and non-transitory computer-readable medium described herein may further include operations, features, means, or instructions for configuring the wakeup message to be received by the UE at an interference level higher than a different UE-specific control message received at the UE.

Some examples of the method, apparatuses, and non-transitory computer-readable medium described herein may further include operations, features, means, or instructions for receiving, based on the beam management procedure, a signal from the UE.

Some examples of the method, apparatuses, and non-transitory computer-readable medium described herein may further include operations, features, means, or instructions for identifying that a response to the transmitted wakeup message may have not been received from the UE and retransmitting, based on the identification, the wakeup message to the UE using the first transmit beam.

Some examples of the method, apparatuses, and non-transitory computer-readable medium described herein may further include operations, features, means, or instructions for identifying that a response to the transmitted wakeup message may have not been received from the UE and transmitting, based on the identification, a command to the UE to terminate an active state.

Some examples of the method, apparatuses, and non-transitory computer-readable medium described herein may further include operations, features, means, or instructions for encoding the wakeup message using a UE identifier.

In some examples of the method, apparatuses, and non-transitory computer-readable medium described herein, the UE identifier includes at least a portion of a cell radio network temporary identifier (C-RNTI).

In some examples of the method, apparatuses, and non-transitory computer-readable medium described herein, the wakeup message may be configured with a predetermined DCI format, the predetermined DCI format indicating that the data may be available to be transmitted to the UE.

In some examples of the method, apparatuses, and non-transitory computer-readable medium described herein, the predetermined DCI format indicates a configuration for a set of beam management transmissions to the UE using a set of transmit beams during the beam management procedure, each transmit beam of the set of transmit beams being transmitted in a different direction and having a narrower beam width than the first transmit beam.

In some examples of the method, apparatuses, and non-transitory computer-readable medium described herein, the configuration for the set of beam management transmissions includes an indication of resources to be used for the set of beam management transmissions.

In some examples of the method, apparatuses, and non-transitory computer-readable medium described herein, the DCI format includes at least one bit indicating that the data may be available to be transmitted to the UE and at least one bit indicating a configuration for a beam management procedure.

In some examples of the method, apparatuses, and non-transitory computer-readable medium described herein, the first transmit beam includes a beamformed waveform having a predetermined beam width.

In some examples of the method, apparatuses, and non-transitory computer-readable medium described herein, the beam management transmission includes a channel state information reference signal (CSI-RS), or a synchronization signal (SS), or a combination thereof.

In some examples of the method, apparatuses, and non-transitory computer-readable medium described herein, the SS includes a PSS, or a SSS, or a demodulation reference signal (DMRS), or a combination thereof.

In some examples of the method, apparatuses, and non-transitory computer-readable medium described herein, the wakeup message is transmitted in a PDCCH message using cyclic redundancy check (CRC) bits scrambled using an identifier of the UE.

A method of wireless communication at a UE is described. The method may include receiving, while operating in a DRX mode, a wakeup message from a base station, the wakeup message transmitted using a first transmit beam and indicating that data is available to be transmitted to the UE, receiving, based on the indication that data is available to be transmitted to the UE, a second set of signals during a beam management procedure, where the second set of signals are transmitted using a second set of transmit beams, and transmitting, based on the beam management procedure, a signal to the base station.

An apparatus for wireless communication at a UE is described. The apparatus may include a processor, memory in electronic communication with the processor, and instructions stored in the memory. The instructions may be executable by the processor to cause the apparatus to receive, while operating in a DRX mode, a wakeup message from a base station, the wakeup message transmitted using a first transmit beam and indicating that data is available to be transmitted to the UE, receive, based on the indication that data is available to be transmitted to the UE, a second set of signals during a beam management procedure, where the second set of signals are transmitted using a second set of transmit beams, and transmit, based on the beam management procedure, a signal to the base station.

Another apparatus for wireless communication at a UE is described. The apparatus may include means for receiving, while operating in a DRX mode, a wakeup message from a base station, the wakeup message transmitted using a first transmit beam and indicating that data is available to be transmitted to the UE, receiving, based on the indication that data is available to be transmitted to the UE, a second set of signals during a beam management procedure, where the second set of signals are transmitted using a second set of transmit beams, and transmitting, based on the beam management procedure, a signal to the base station.

A non-transitory computer-readable medium storing code for wireless communication at a UE is described. The code may include instructions executable by a processor to receive, while operating in a DRX mode, a wakeup message from a base station, the wakeup message transmitted using a first transmit beam and indicating that data is available to be transmitted to the UE, receive, based on the indication that data is available to be transmitted to the UE, a second set of signals during a beam management procedure, where the second set of signals are transmitted using a second set of transmit beams, and transmit, based on the beam management procedure, a signal to the base station.

In some examples of the method, apparatuses, and non-transitory computer-readable medium described herein, the first transmit beam includes a pseudo-omni transmit beam and the second set of transmit beams include transmit beams having a narrower beam width than the first transmit beam.

In some examples of the method, apparatuses, and non-transitory computer-readable medium described herein, the first transmit beam and the second set of transmit beams may be different transmit beams.

In some examples of the method, apparatuses, and non-transitory computer-readable medium described herein, the signal transmitted to the base station includes a beam recovery signal.

In some examples of the method, apparatuses, and non-transitory computer-readable medium described herein, the signal transmitted to the base station includes an indication of a beam index, the beam index based on the beam management procedure.

Some examples of the method, apparatuses, and non-transitory computer-readable medium described herein may further include operations, features, means, or instructions for receiving, while operating in the DRX mode, a subsequent wakeup message from the base station, maintaining an on duration of the DRX mode when the subsequent wakeup message indicates that data may be available to be transmitted to the UE and transitioning to a sleep state of the DRX mode when the subsequent wakeup message does not indicate that data may be available to be transmitted to the UE.

In some examples of the method, apparatuses, and non-transitory computer-readable medium described herein, the wakeup message includes a PDCCH message.

In some examples of the method, apparatuses, and non-transitory computer-readable medium described herein, the wakeup message is received in a PDCCH message using CRC bits scrambled using an identifier of the UE.

DETAILED DESCRIPTION

Figure 1:
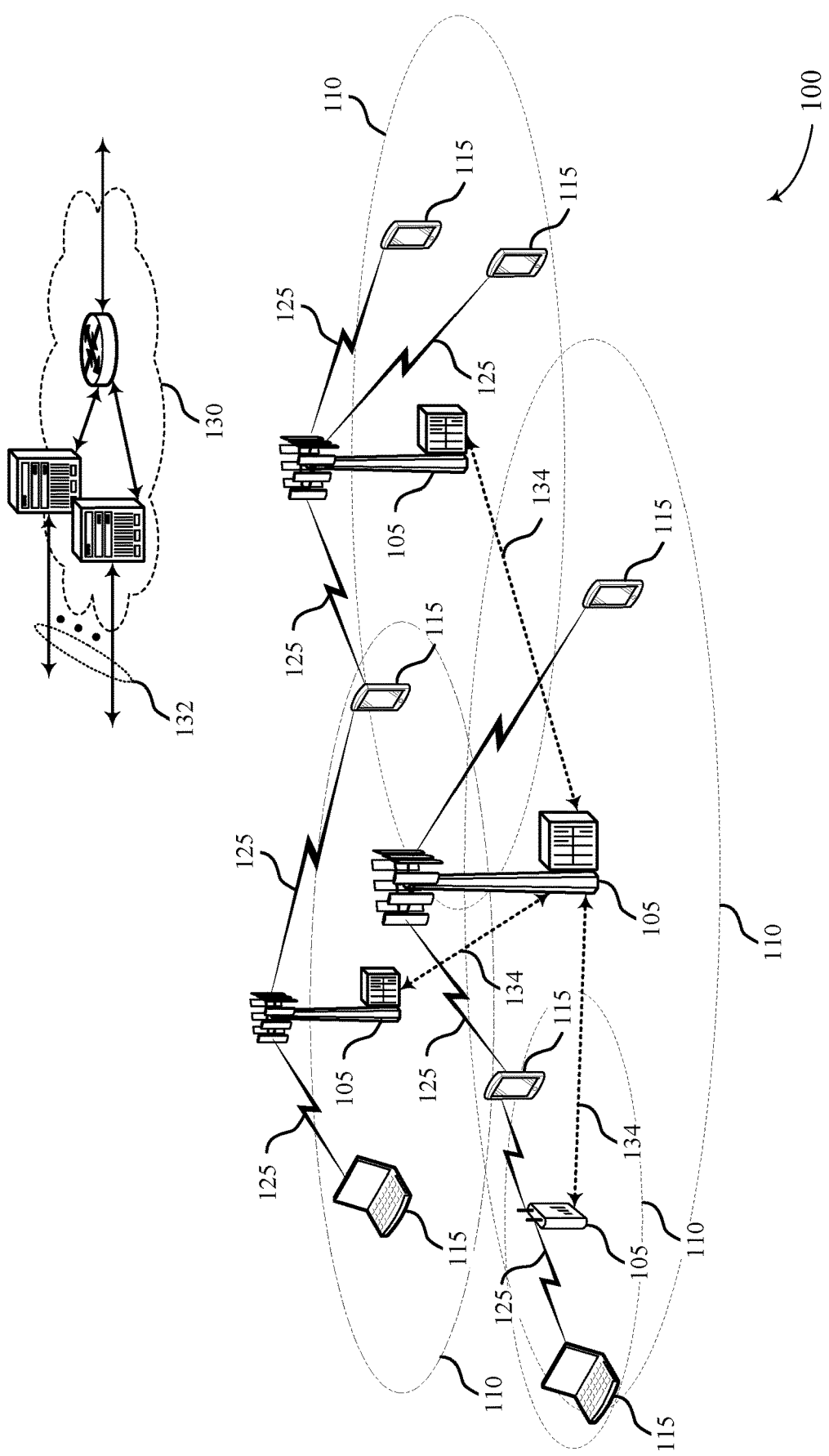
FIG. 1 illustrates an example of a system for wireless communication that supports a wake up procedure using a pseudo-omni beam in accordance with aspects of the present disclosure.

In some cases, a user equipment (UE) may monitor a wireless link continuously for an indication that the UE may receive data. In other cases (e.g., to conserve power and extend battery life) a UE may be configured with a discontinuous reception (DRX) cycle (e.g., while operating in a connected DRX (C-DRX) mode). A DRX cycle may consist of an active state (e.g., an On Duration) when the UE may monitor for control information (e.g., on a physical downlink control channel (PDCCH)) and a sleep state where the UE may power down radio components. In some cases, a UE may be configured with a short DRX cycle and a long DRX cycle. In some cases, a UE may enter a long DRX cycle if it is inactive for one or more short DRX cycles.

In a millimeter wave (mmW) wireless communication system, the DRX process may be complicated by the fact that the a beam management may need to be performed between the UE and a mmW base station, e.g., a next generation nodeB (gNB). Beam management is a learning process and may include the gNB transmitting beam management beams to identify one or more active beams for communications between the UE and gNB (e.g., active transmit and receive beam at the gNB and/or the UE). In a DRX mode, the UE may move within the coverage area of the gNB while in the sleep state such that the active beam previously used for communications is no longer usable by the time when the UE awakes from the sleep state, for example at the next awake duration. Accordingly, the UE and/or gNB may be unsure which beam profile, including one or more transmit beams and/or receive beams, should be used for communications between the UE and the gNB.

Aspects of the disclosure are initially described in the context of a wireless communications system, such as a mmW wireless communication system. In some aspects, a gNB may use a pseudo-omni transmit beam to wakeup a UE operating in a DRX mode. For example, the UE may be operating in a DRX mode and the gNB may have data available for the UE. The gNB may configure and transmit a wakeup message to the UE using a first transmit beam, e.g., a pseudo-omni transmit beam. The first transmit beam may include a beamformed beam having a wide beam width, e.g., a beam width wider than the beam width used for beam management and/or data communications with the UE, but narrower than a fully omni-directional transmit beam. The gNB may also transmit beam management transmissions to the UE, e.g., channel state information reference signal(s) (CSI-RS(s)) and/or synchronization signal(s), in a second set of signals during a beam management procedure. In some aspects, the second set of signals may be transmitted using a second set of transmit beams. The UE may try different receive beam configurations for the beam management transmission(s) to identify a UE receive beam to use for communicating with the gNB. In some instances, the UE may respond by transmitting a signal, e.g., a beam recovery message, to the gNB. In other instances, the UE may respond to the wakeup message by transmitting the signal to the gNB. In some instances, the signal may carry or otherwise convey an indication of the UE receive beam and/or a beam management transmission beam index. The gNB may receive the signal and identify a second transmit beam to use for transmitting the data to the UE.

Aspects of the disclosure are further illustrated by and described with reference to apparatus diagrams, system diagrams, and flowcharts that relate to a wake up procedure using a pseudo-omni beam.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

DRX cycles can be configured in the LTE downlink so that the UE 115 does not have to decode the PDCCH or receive physical downlink shared channel (PDSCH) transmissions in certain subframes. In some cases, a UE 115 may monitor a communication link 125 continuously for an indication that the UE 115 may receive data. In other cases (e.g., to conserve power and extend battery life) a UE 115 may be configured with a DRX cycle. A DRX cycle consists of an On Duration when the UE 115 may monitor for control information (e.g., on PDCCH) and a DRX period (or sleep state) when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a DRX Inactivity Timer. If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a DRX Short Cycle Timer. When the DRX Short Cycle Timer expires, the UE 115 may resume a long DRX cycle.

In some aspects, a base station 105 may identify that data is available to be transmitted to a UE 115 that is operating in a DRX mode. The base station 105 may transmit, based at least in part on identifying that the data is available to be transmitted to the UE 115, a wakeup message to the UE using a first transmit beam. The base station 105 may initiate a beam management procedure based at least in part on identifying that the data is available to be transmitted to the UE, to identify a transmit beam for the base station to use to transmit the available data to the UE. The transmit beam may have a narrower beam width than the first transmit beam.

In some aspects, a UE 115 may receive, while operating in a DRX mode, a wakeup message from a base station, the wakeup message transmitted using a first transmit beam and indicating that data is available to be transmitted to the UE. The UE 115 may receive, based at least in part on the indication that data is available to be transmitted to the UE, a second set of signals during a beam management procedure, wherein the second set of signals are transmitted using a second set of transmit beams. The UE 115 may transmit, based at least in part on the beam management procedure, a signal to the base station In some aspects, a UE 115 may receive, while operating in an on duration of a DRX mode, a wakeup message from a base station, the wakeup message transmitted using a first transmit beam and indicating whether data is available to be transmitted to the UE 115. The UE 115 may maintain the on duration of the DRX mode when the wakeup message indicates that data is available to be transmitted to the UE. The UE 115 may transition to a sleep state of the DRX mode when the wakeup message does not indicate that data is available to be transmitted to the UE.

Figure 2:
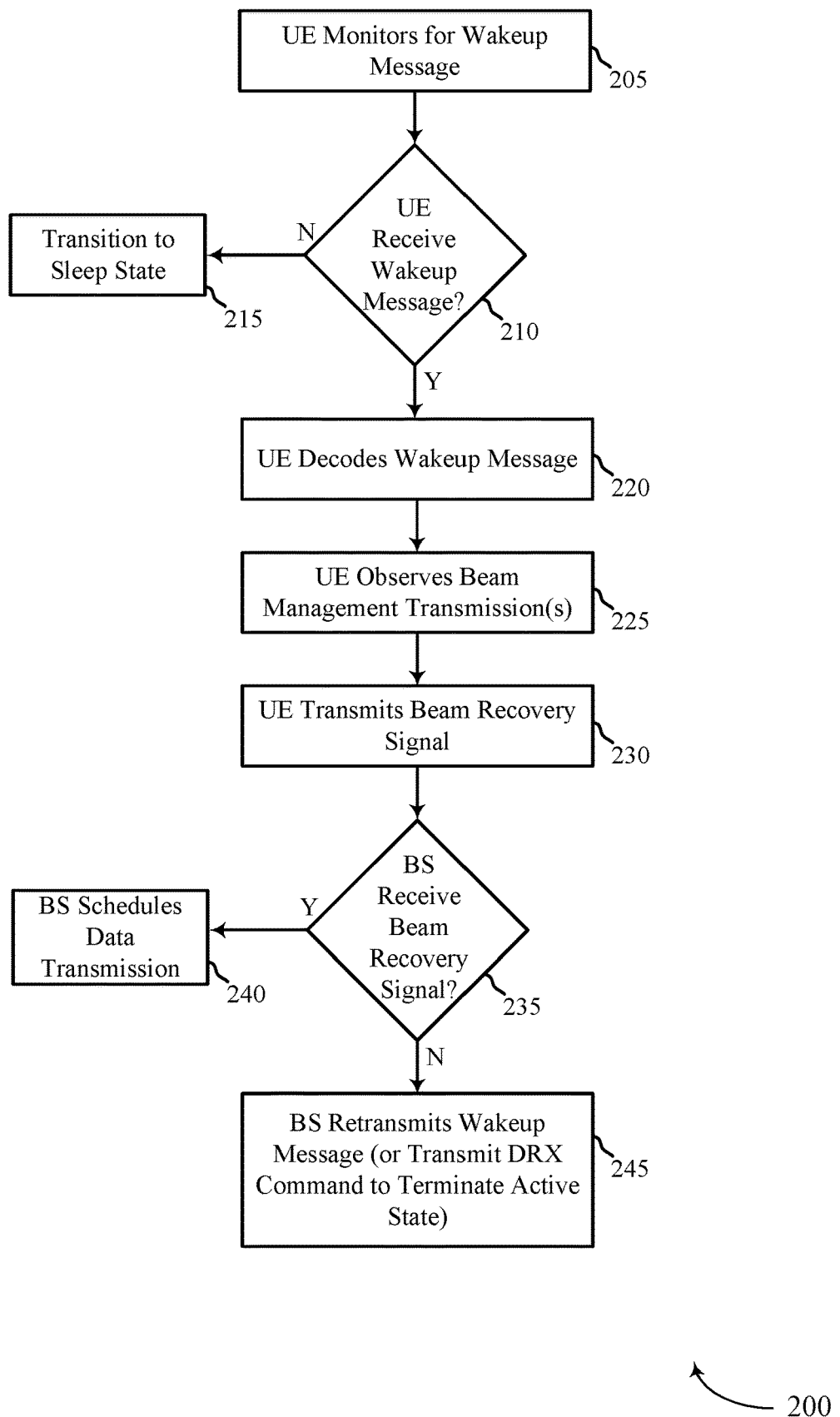
FIG. 2 illustrates an example of a method that supports a wake up procedure using a pseudo-omni beam in accordance with aspects of the present disclosure.

FIG. 2 illustrates an example of a method 200 that supports a wake up procedure using a pseudo-omni beam in accordance with various aspects of the present disclosure. In some examples, method 200 may implement aspects of wireless communications system 100. Aspects of method 200 may be implemented by a UE and/or a base station (e.g., gNB), which may be examples of the corresponding devices described herein.

At 205, a UE may be monitoring for a wakeup message from a base station. For example, the UE may be operating in a DRX mode that includes the UE temporarily transitions to an active state (or On Duration) to monitor for a control channel to determine if there is data available for the UE. The control channel may include a PDCCH, in some examples. The PDCCH may carry or otherwise convey information indicating that the base station has data to transmit to the UE, if applicable.

At 210, the UE may determine whether a wakeup message was received from the base station. If no wakeup message was received from the base station while the UE was in the active state, at 215 the UE may transition back to the sleep state and continue operating in the DRX mode. If the base station does have data available for the UE and the UE does receive the wakeup signal while in the active state, at 220 the UE decodes the wakeup message.

In some aspects, the base station may transmit the wakeup message using a first transmit beam, e.g., a pseudo-omni transmit beam. Generally, the base station may be a mmW base station (e.g., a gNB) that communicates using directional or beamformed transmissions. Each beamformed transmission may have an associated beamforming configuration associated with the transmit direction of the beam, the beam width, the beam shape, the beam angle of departure, the beam elevation, and the like. In one non-limiting example, the base station may transmit beamformed transmissions using a first transmit beam that covers a large geographic area, but at a reduced gain, a broad beam that reduces the coverage area but increases the gain, and a narrow beam that has a narrow beam width and a large gain. In some aspects, the first transmit beam has a beam width that is wider than a beam width the base station uses to transmit other beamformed transmissions, e.g., beam management transmissions, data transmissions, and the like.

In some aspects, the wakeup message may be transmitted in a PDCCH message. In some aspects, this may include the wakeup message using CRC bits scrambled using an identifier of the UE, e.g., a C-RNTI configured for the UE.

In some aspects, the wakeup message may be transmitted with a low code rate, e.g., the lowest available code rate. The low code rate may improve the possibility of the UE receiving the wakeup message without having performed beam management prior to transitioning to the active state. For example, the base station may modulate the wakeup message with a first code rate that is lower than a code rate used to modulate the beam management transmission.

In some aspects, the base station may use a predetermined downlink control information (DCI) format that indicates a configuration for a beam management transmission, e.g., a second set of signals transmitted during a beam management procedure. For example, the DCI format may be small (e.g., one or two bits) to provide for a small payload for the wakeup message. In some aspects, the one or more bits in the DCI format may indicate the selection of the resources to be used to transmit the beam management transmissions, e.g., the pre-configured CSI-RS resources.

In some aspects, the UE may receive the wakeup message over multiple symbol periods. For example, the base station may repeat the transmission of the wakeup message over multiple symbol periods. This may allow the UE to try different receive beam configurations to identify and/or select a subarray (e.g., a UE receive beam) to use for communicating with the base station. That is, the UE may cycle through different antenna receive beam configurations to determine which configuration best receives the wakeup message, e.g., which receive beam configuration receives the wakeup message with the highest receive power, with the lowest interference level, etc.

In some aspects, the UE may receive the wakeup message while in the active state of the DRX mode. For example, the base station may know when the UE is scheduled to transition between the active state and the sleep state and schedule the transmission of the wakeup message for when the beginning of the active state. In other aspects, the UE may wake up early from the sleep state to monitor for and receive the wakeup message. Accordingly, the UE may transition from the sleep state to the active state in response to receiving the wakeup message from the base station.

At 220, the UE may decode the wakeup message received from the base station. In some aspects, the base station may encode the wakeup message using some or all of a UE identifier (e.g., a cell radio network identifier (C-RNTI). In one example, the base station may identify that data is available for the UE and identify the DCI payload with the one or two bits. The base station may add an error detection code (e.g., a cyclic redundancy check (CRC)) to the DCI payload. The base station may scramble the CRC/DCI payload using some or all of the C-RNTI of the UE. The base station may then apply channel coding (e.g., using a first code rate that is the lowest available code rate) and rate matching.

In one example, the UE may decode the wakeup message by applying the hypothesis tests. For example, different DCI formats have different payload sizes. The UE may apply the hypothesis test over some or all of the possible payload sizes to decode the wakeup message. The UE may identify the predetermined DCI format payload and size using the hypothesis tests to identify the configuration to be used for beam management transmissions.

At 225, the UE may observe the beam management transmissions. That is, the base station may transmit (and the UE may receive) beam management transmission(s) that include a second set of signals transmitted during a beam management procedure. The second set of signals may be transmitted using a second set of transmit beams. The beam management transmissions may be transmitted using the resources identified in the predetermined DCI format. In some aspects, the beam management transmissions may include a reference signal (e.g., a CSI-RS) and/or a synchronization signal. The synchronization signal may include any combination of a primary synchronization signal (PSS), a secondary synchronization signal (SSS), and a demodulation reference signal (DMRS).

In some aspects, the beam management transmissions from the base station may be transmitted using different transmit beam(s) than was used to transmit the wakeup message. For example, the wakeup message may be transmitted using a first transmit beam, e.g., a pseudo-omni transmit beam, and the beam management transmissions may be transmitted using a second set of transmit beam that have a narrower beam width than the first transmit beam.

In some aspects, the UE may identify or select a base station transmit beam using the beam management transmissions. For example, the UE may determine which transmit beam from the base station is received with the highest receive power level, with the lowest interference level, and the like. Each transmit beam from the base station may have an associated index number and the UE may determine which transmit beam index is the most suited for communicating with the base station.

At 230, the UE may transmit a signal (or message) to the base station. The signal, e.g., a beam recovery signal (or message) may be transmitted in response to the UE receiving the beam management transmissions. In some aspects, the signal may be configured to carry or otherwise convey an indication of the transmit beam most suited for communicating with the base station, e.g., the beam index of the transmit beam identified during the beam management procedure. In some aspects, the signal may carry information indicating multiple beam indexes from the beam management transmission(s), with each beam index having an associated receive power level, interference level, and the like. Accordingly, the UE may transmit an indication of the preferred base station transmit beam and/or an indication of the performance of each transmit beam used during the beam management procedure.

At 235, the base station may determine whether a signal was received from the UE. If the signal was received, at 240 the base station may schedule the data transmission to the UE. For example, the base station may, based on the signal, transmit the data to the UE using a third transmit beam. In some aspects, the third transmit beam may have a beam width that is narrower than the beam width used to transmit the wakeup message and/or the beam management transmissions. In some aspects, the base station may identify the beam index (or multiple beam indexes) carried in the signal and select the third transmit beam based on this information. In some aspects, the third transmit beam is the same transmit beam configuration identified by the UE as the preferred base station transmit beam, e.g., the same beam index received at the UE with the highest receive power level, with the lowest interference level, and the like.

If the signal was not received at the base station, the base station has several options at 245. In one example, the base station may determine that no response has been received to the wakeup signal (e.g., no beam recovery signal) and retransmit the wakeup message to the UE. For example, the base station may continue to retransmit the wakeup message to the UE for a predetermined number of transmissions (or time period). In some aspects, the base station may continue to retransmit the wakeup message while the UE is in the active state (or On Duration). In another option, the base station may, based on receiving no response, transmit a command that indicates to or instructs the UE to terminate the DRX active state. That is, the base station may transmit a DRX command to the UE that instructs the UE to stop operating in the DRX mode and instead transition to a connected mode where the UE establishes a radio link with the base station. During the radio link establishment procedure (e.g., an RRC procedure), the base station may then inform the UE that it has data available for the UE.

In some examples, the data transmission may be transmitted using a PDSCH. In some case, the PDSCH may transmitted using beam sweeping. In other examples, the PDCCH may be transmitted using beam sweeping, and the PDSCH does not use beam sweeping.

In some cases, each of the reference signals may contain one or more SS bursts (or SS blocks), channel state information reference signal (CSI-RS) bursts, or both. Each of the bursts may have a configurable periodicity (e.g., 5, 10, 20, 40, 80, 160 ms). The SS bursts may be independent of the channel bandwidth and contain one or more PSS symbols, SSS symbols, and PBCH symbols. For example, a single SS burst may contain one PSS symbol, one SSS symbol, and two PBCH symbols containing demodulation reference signal (DMRS) sequences. In some examples, multiple symbols may be used to train receive beams during a beam training procedure. For example the SSS symbol plus two PBCH symbols may train three receive beams. In other examples, other combinations of a PSS, SSS, and PBCHs, may be used to training multiple receive beams.

In other cases, each of the reference signals may contain one or more SS bursts with a subsequent beam-swept paging transmission distinct from CSI-RS transmission and quasi co-located (QCL) with the antenna resources of the one or more SS bursts. A quasi co-location relationship between one or more beam transmissions may refer to a spatial relationship between the antenna ports (and the corresponding signaling beams) of the respective transmissions. For example, one or more antenna ports may be implemented by a base station for transmitting at least one or more reference signals and command information transmissions (e.g., C-RNTI) to a UE. However, the channel properties of the signals sent via the different antenna ports may be interpreted to be the same (e.g., despite the signals being transmitting from different antenna ports), and the antenna ports (and the respective beams) may be determined to be QCL. In such cases, the UE may have respective antenna ports to emit receive beams used for receiving the QCL transmissions (e.g., reference signal, C-RNTI). The SS bursts may contain one or more PSS, SSS, and PBCH symbols, and the PBCH symbol may contain DMRS sequences. A base station may configure the paging transmission such that the transmission is multiplexed with one or more SS bursts or schedule the paging transmission as subsequent indication following a SS burst transmission. In some cases, a base station may provide an indication of the paging information via DCI or a non-scheduled physical channel. For example, a base station may transmit a single SS burst containing each of a single SSS symbol, PSS symbol, and two PBCH symbols containing DMRS sequences. A base station may provide subsequent reference signaling to a UE via paging indication via beam-swept transmission. The paging signaling may be QCLed with the set of transmit beams corresponding to the preceding SS burst.

Figure 3:
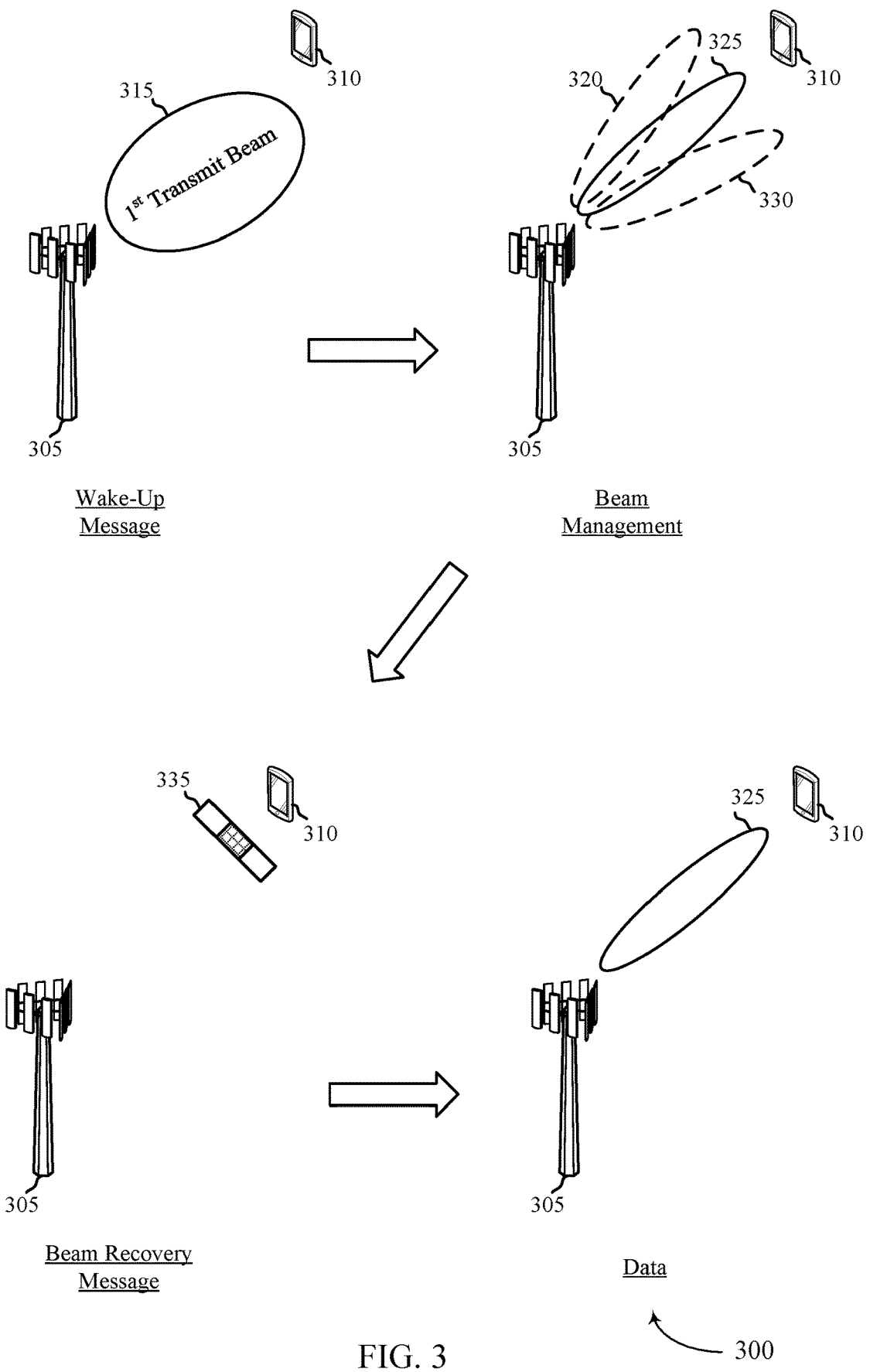
FIG. 3 illustrates an example of a system for wireless communication that supports a wake up procedure using a pseudo-omni beam in accordance with aspects of the present disclosure.

FIG. 3 illustrates an example of a wireless communication system 300 that supports a wake up procedure using a pseudo-omni beam in accordance with various aspects of the present disclosure. In some examples, wireless communication system 300 may implement aspects of wireless communications system 100 and/or method 200. Wireless communication system 300 may include a base station 305 and a UE 310, which may be examples of the corresponding devices described herein.

Initially, the base station 305 may determine that it has data available for UE 310. The base station 305 may determine that the UE 310 is operating in a DRX mode and, according to the DRX mode, when the UE 310 will be monitoring for a wakeup message. Accordingly, the base station 305 may configure and transmit a wakeup message to the UE 310. The wakeup message may be a PDCCH message and may be transmitted using a first transmit beam 315. In some aspects, the first transmit beam 315 may be a pseudo-omni transmit beam. For example, the first transmit beam 315 may have a relatively wide beam width (e.g., as compared to a beam width of transmit beam(s) used to transmit beam management transmissions and/or data). The wakeup message may be encoded with a lowest available code rate, may be transmitted across multiple symbol periods, and may include a DCI format that indicates the resource(s) configured for beam management transmissions.

In some aspects, the base station 305 may select the transmit beam for the wakeup message based on the DRX cycle of the DRX mode the UE 310 is operating in. For example, the UE 310 may be configured to operate in a long DRX cycle (e.g., 10, 20, 32, . . . , 2560 ms) or a short DRX cycle (e.g., 2, 5, 8, . . . , 640 ms). In some aspects, the base station 305 may determine that the UE 310 is operating in a DRX mode having a DRX cycle having a predetermined cycle length (e.g., a short DRX cycle) and use a fourth transmit beam to transmit the wakeup message. The fourth transmit beam may have a beam width that is broader than the first transmit beam 315. In another example, the base station 305 may select the first transmit beam 315 when the UE 310 is operating in a relatively short DRX cycle and the fourth transmit beam when the UE 310 is operating in an even shorter DRX cycle.

In some aspects, the wakeup message may be a waveform other than the PDCCH message. For instance, the waveform may be preconfigured by the base station 305 and/or UE 310 and operate in an "on-off" manner. The DRX mode may be reconfigured such that the UE 310 monitors for the waveform. The waveform may be transmitted (e.g., "on") when the base station 305 has data available for the UE 310 and may not be transmitted (e.g., "off") when the base station 305 does not have data available for the UE 310. The waveform may carry or otherwise convey part or all of the C-RNTI, e.g., some or all of the C-RNTI may be scrambled in the waveform. The waveform can also be repeated over multiple symbol periods, which allows the UE 310 to select a UE receive beam configuration to use.

The waveform used for the wakeup message may serve as the wakeup signal for the UE 310 for the DRX operation. In some aspects, the base station 305 may use the waveform for other purposes. For example, besides triggering the wakeup signal due to in-coming data for the UE 310, the base station 305 may also use the waveform to trigger a beam management procedure with the UE 310, e.g., due to poor beam performance and/or the current active beam being older than a predetermined time period. When the downlink beam performance deteriorates below a threshold level, the UE 310 may send a request (e.g., beam recovery signal) and the base station 305 may transmit the waveform to initiate the beam management procedure. In some aspects, the waveform may also be transmitted using a first transmit beam or some other beam configuration having a broad beam width to ensure reliable reception.

After transmitting the wakeup message, the base station 305 may transmit beam management transmissions (e.g., beam management beams 320, 325, and 330, which may also be referred to as a second set of transmit beams). The beam management transmissions may have a beam width that is narrower than the beam width used to transit the wakeup message, e.g., the first transmit beam 315. The UE 310 may receive the beam management transmissions and identify the best base station 305 transmit beam, e.g., the transmit beam having the highest receive power, highest receive quality, with the lowest interference level, and the like. In some aspects, the beam management beam 325 may be the best base station 305 transmit beam. In some aspects, the UE 310 may also capture performance metrics for each beam management transmission beam.

The UE 310 may respond to the beam management transmissions by transmitting a signal 335, which may also be referred to as a beam recovery message. The signal 335 may carry or otherwise convey an indication of the best base station 305 transmit beam (e.g., beam management beam 325). In some aspects, the signal 335 may also carry other performance metrics for the other beam management beams (e.g., beam management beams 320 and 330). The signal 335 may explicitly identify the beam management beam 325 as the best base station 305 transmit beam or may simply indicate the performance metrics associated with each beam management transmission.

The base station 305 may receive the signal 335 and respond by scheduling and transmitting the data to the UE 310 using a transmit beam, e.g., the best base station 305 transmit beam or third transmit beam.

Figure 4:
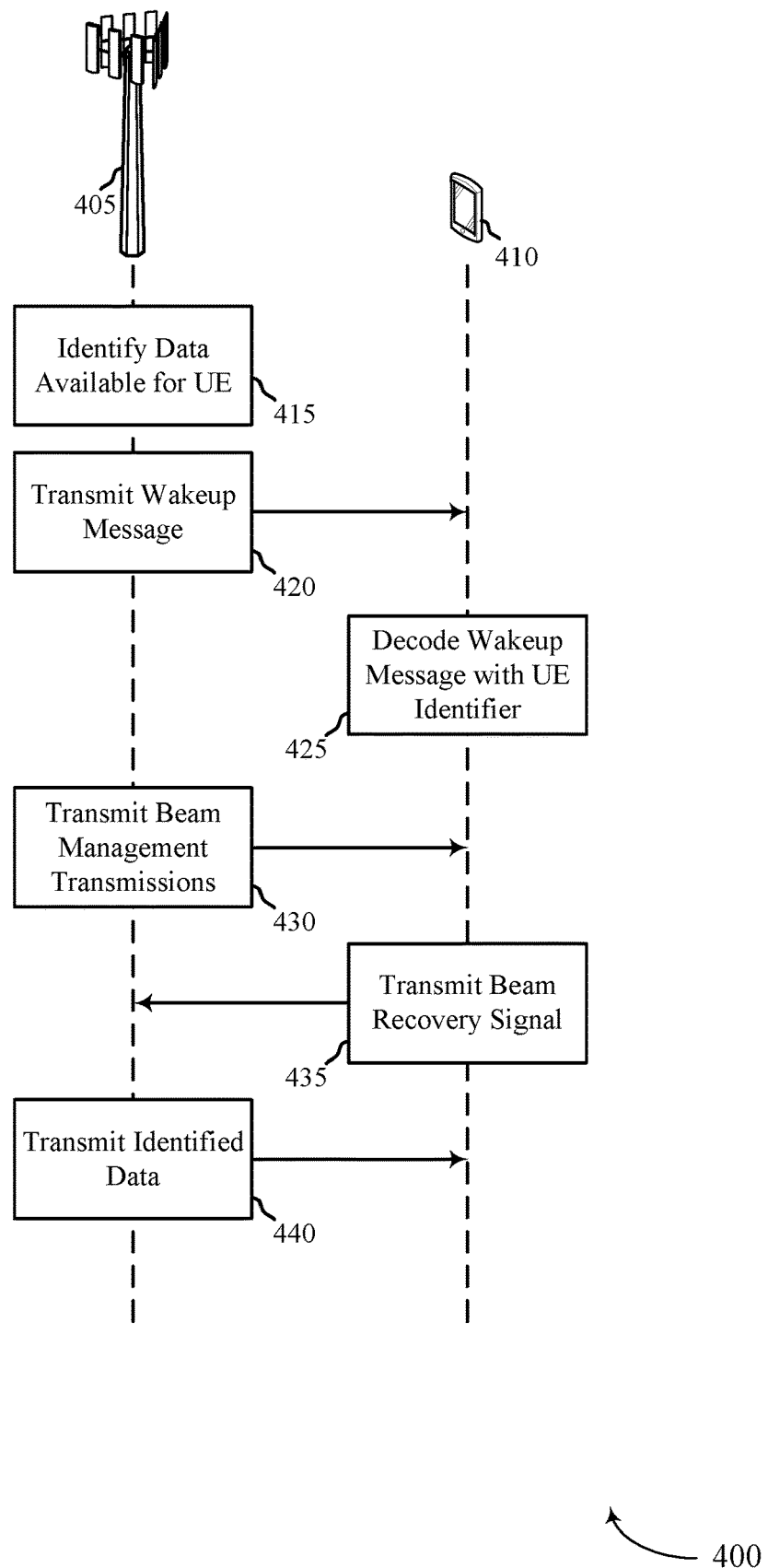
FIG. 4 illustrates an example of a process that supports a wake up procedure using a pseudo-omni beam in accordance with aspects of the present disclosure.

FIG. 4 illustrates an example of a process 400 that supports a wake up procedure using a pseudo-omni beam in accordance with various aspects of the present disclosure. In some examples, process 400 may implement aspects of wireless communication systems 100 and/or 300, as well as method 200. Process 400 may include a base station 405 and a UE 410, which may be examples of the corresponding devices described herein.

At 415, the base station 405 may determine or otherwise determine that data is available to be transmitted to the UE 410. The UE 410 may be operating in a DRX mode. For example, the base station 405 may receive data in one or more buffers with a destination address corresponding to the UE 410.

At 420, the base station 405 may transmit a wakeup message to the UE 410. The wakeup message may be transmitted in response to the determination that data is available to be transmitted to the UE 410. The base station 405 may transmit the wakeup message using a first transmit beam, e.g., a pseudo-omni transmit beam. The wakeup message may carry or otherwise convey an indication that the data is available to be transmitted to the UE 410, e.g., include one or more bits indicating that the data is available. The one or more bits may be carried in a DCI format associated with a wakeup procedure, e.g., a small payload DCI format. In some aspects, the base station 405 may use a UE identifier associated with the UE 410 to encode the wakeup message, e.g., a C-RNTI of the UE 410. The first transmit beam may have a beam width that is wider than the beam widths used for other signals/messages transmitted to the UE 410, e.g., beam management transmit beams, data transmit beams, etc.

In some aspects, the wakeup message may also carry or otherwise convey an indication of a configuration for a beam management procedure. For example, the DCI format may also include one or more bits that indicate the configuration, e.g., one or more resources to be used for the beam management procedure.

In some aspects, the wakeup message may be a PDCCH message. In some aspects, the base station 405 may use a lowest available code rate to encode the wakeup message. In some aspects, the base station 405 may use a code rate to encode the wakeup message that is lower than the code rate(s) used to transit other control messages to the UE 410, e.g., other UE-specific PDCCH messages. This may support the base station 405 configuring the wakeup message to be received at an interference level higher than a different (or other) UE-specific control message(s).

In some aspects, the base station 405 may repeat transmission of the wakeup message. For example, the base station 405 may transmit multiple instances of the wakeup message over different symbol periods. Each transmission of the wakeup message may be performed using a beamforming configuration such that each transmission is transmitted in a different direction. This may support the UE 410 cycling through the multiple instances of the wakeup message to identify a receive beam configuration to use for communications with the base station 405.

In some examples, at 420, the UE 410 may receive the wakeup message from the base station 405, and maintain the on duration of the DRX mode when the wakeup message indicates that data is available to be transmitted to the UE 410 by the base station 405. However, if the wakeup message does not indicate that data is available to be transmitted to the UE 410, the UE 410 may transition to a sleep state of the DRX mode.

At 425, the UE 410 may decode the wakeup message using a UE identifier. For example, the UE 410 may use a C-RNTI associated with the UE 410 to decode the wakeup message. Decoding the wakeup message may support the UE 410 identifying that data is available to be transmitted from the base station 405. In the instance where the wakeup message also carries the configuration for the beam management procedure, the UE 410 may identify the configuration during the decoding of the wakeup message.

At 430, the base station 405 may transmit a beam management transmission to the UE 410 using a set of second transmit beams. For example, the base station 405 may initiate a beam management procedure with the UE 410 based on the data being available to transmit to the UE 410. The beam management procedure may be used to identify a transmit beam for the base station 405 to use to transmit the available data to the UE 410. For example, the beam management procedure may include the base station 405 transmitting a set of beam management transmissions (e.g., a second set of signals) to the UE 410 using a second set of transmit beams, where each transmit beam of the set of transmit beams is transmitted in a different direction and has a narrower beam width than the first transmit beam. The UE 410 may select the transmit beam for the base station 405 to use for the data transmission from the set of transmit beams. In some aspects, the transmit beams transmitted during the beam management procedure may include CSI-RS(s) and/or synchronization signal(s), e.g., PSS, SSS, DMRS, and the like.

At 435, the UE 410 may transmit a signal, e.g., a beam recover signal, to the base station 405. The UE 410 may transmit the signal to the base station 405 in response to receiving the beam management procedure transmissions. In some aspects, the signal may carry or otherwise indicate an identifier associated with the transmit beam that the UE 410 selects for the base station 405 to transmit the available data on. The identifier and may a beam index and may correspond to the transmit beam from the set of transmit beams transmitted during the beam management procedure having the highest receive power level, with the lowest interference level, and the like.

In some aspects where the base station 405 does not receive any response from the UE 410 to the wakeup message (e.g., a beam recovery signal), the base station 405 may retransmit the wakeup message to the UE 410. In some aspects, the base station 405 may transmit a command to the UE 410 to terminate an active state of the DRX mode.

At 440, the base station 405 may transmit the identified data to the UE 410. For example and based on the signal, the base station 405 may transmit the identified data to the UE 410 using a transmit beam identified in the signal, e.g., the beam index. The transmit beam may be from the set of transmit beams transmitted to the UE 410 in different directions during the beam management procedure. The transmit beam having a narrower beam width than the first transmit beam.

In some aspects, the wakeup message may indicate whether the UE 410 has data available to be transmitted from the base station 405. In the instance where the wakeup message does indicate that the UE 410 has available data, the UE 410 may remain in the on duration of the DRX mode and perform the functions described above. In the instance where the wakeup message does not indicate that the UE 410 has available data, the UE 410 may transition to a sleep state of the DRX mode.

Figure 5:
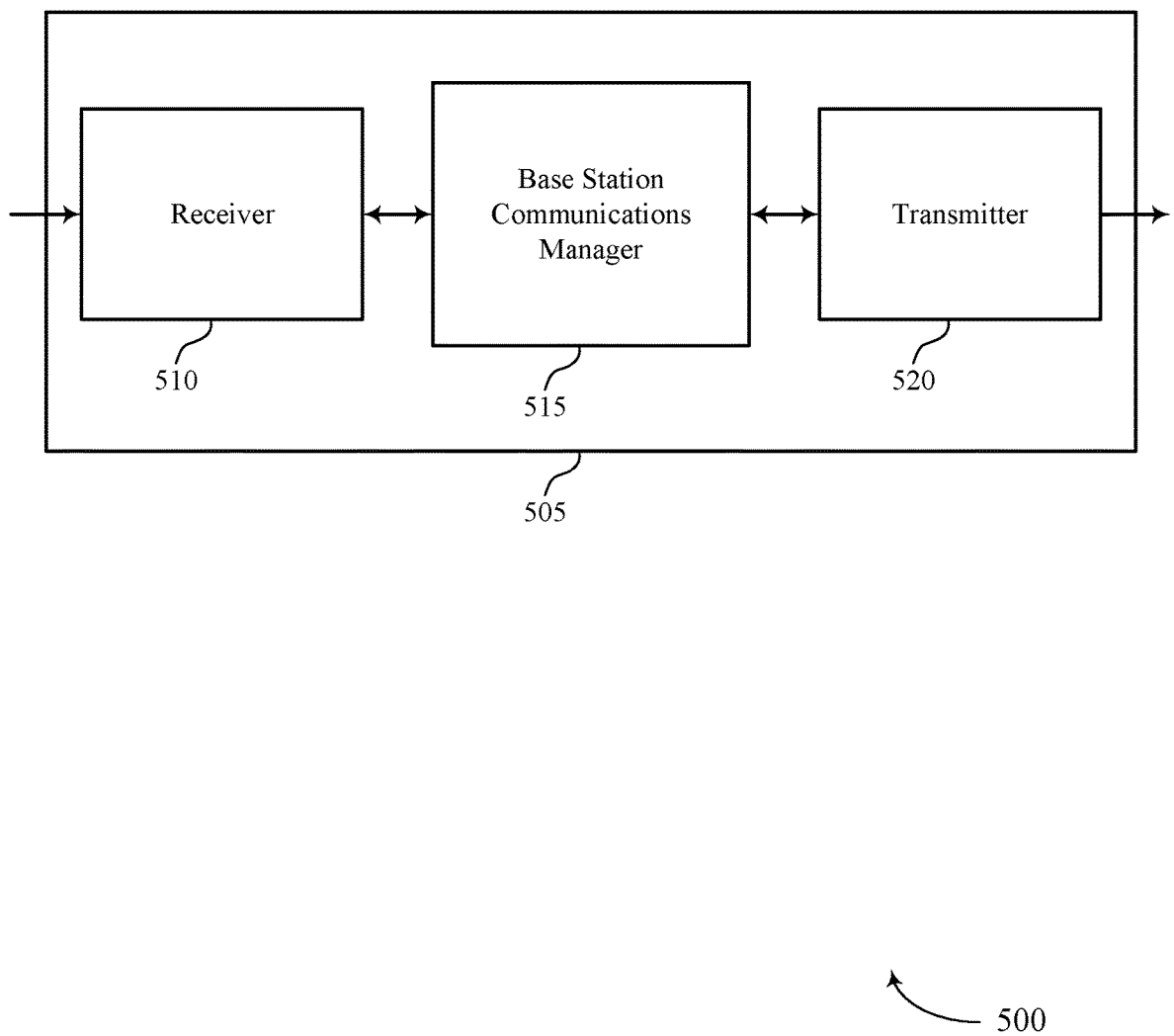
FIGS. 5 through 7 show block diagrams of a device that supports a wake up procedure using a pseudo-omni beam in accordance with aspects of the present disclosure.

FIG. 5 shows a block diagram 500 of a wireless device 505 that supports a wake up procedure using a pseudo-omni beam in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to a wake up procedure using a first beam, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may identify that data is available to be transmitted to a UE that is operating in a DRX mode, transmit, based on identifying that the data is available to be transmitted to the UE, a wakeup message to the UE using a first transmit beam, and initiate a beam management procedure based on identifying that the data is available to be transmitted to the UE, to identify a second transmit beam for the base station to use to transmit the available data to the UE, where the transmit beam includes a narrower beam width than the first transmit beam.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
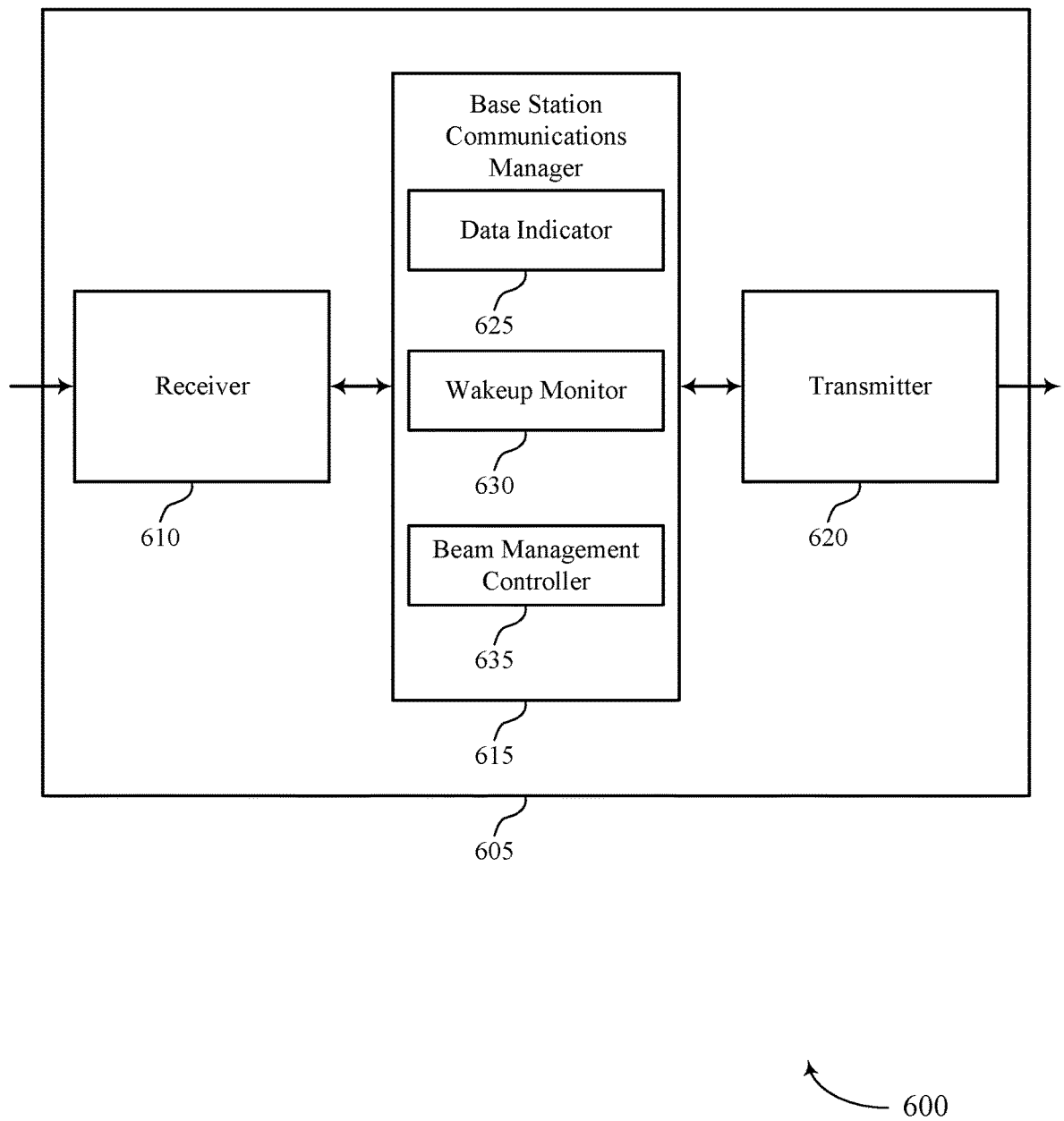

FIG. 6 shows a block diagram 600 of a wireless device 605 that supports a wake up procedure using a pseudo-omni beam in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to a wake up procedure using a pseudo-omni beam, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8.

Base station communications manager 615 may also include data indicator 625, wakeup monitor 630, and beam management controller 635.

Data indicator 625 may identify that data is available to be transmitted to a UE that is operating in a DRX mode. In some cases, the wakeup message includes an indication that the data is available to be transmitted to the UE, and the beam management procedure is initiated based on the data being available.

Wakeup monitor 630 may transmit, based on identifying that the data is available to be transmitted to the UE, a wakeup message to the UE using a first transmit beam. In some cases, the first transmit beam is a pseudo-omni transmit beam and the second transmit beam has a narrower beam width than the first transmit beam. In some cases, the first transmit beam and the second transmit beams are different transmit beams. In some cases, the wakeup message includes a PDCCH message having a lower code rate than a different UE-specific PDCCH message. In some cases, transmitting the wakeup message using the first transmit beam includes: transmitting, using the first transmit beam, a set of instances of the wakeup message over a set of symbol periods. In some cases, the wakeup message is configured with a predetermined DCI format, the predetermined DCI format indicating that the data is available to be transmitted to the UE. In some cases, the predetermined DCI format indicates a configuration for a set of beam management transmissions to the UE using a set of transmit beams during the beam management procedure, each transmit beam of the set of transmit beams being transmitted in a different direction and having a narrower beam width than the first transmit beam. In some cases, the configuration for the set of beam management transmissions includes an indication of resources to be used for the set of beam management transmissions. In some cases, the DCI format includes at least one bit indicating that the data is available to be transmitted to the UE and at least one bit indicating a configuration for a beam management procedure. In some cases, the first transmit beam includes a beamformed waveform having a predetermined beam width.

Beam management controller 635 may initiate a beam management procedure based on identifying that the data is available to be transmitted to the UE, to identify a transmit beam for the base station to use to transmit the available data to the UE, where the transmit beam includes a narrower beam width than the first transmit beam. In some cases, the beam management procedure includes transmitting a set of beam management transmissions to the UE using a set of transmit beams, each transmit beam of the set of transmit beams being transmitted in a different direction and having a narrower beam width than the first transmit beam. In some cases, the beam management transmission includes a CSI-RS, or a SS, or a combination thereof. In some cases, the SS includes a PSS, or a SSS, or a DMRS, or a combination thereof.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
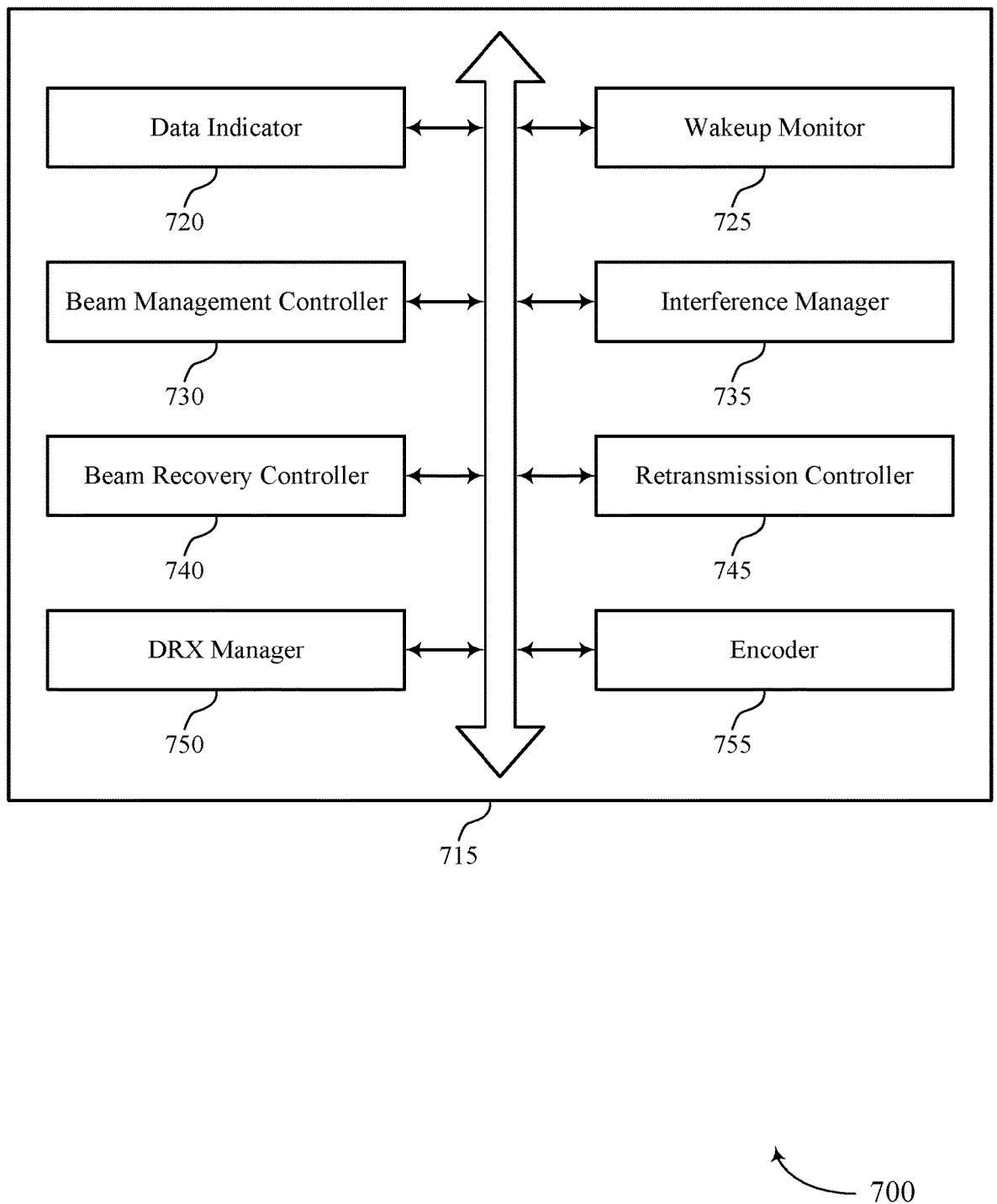

FIG. 7 shows a block diagram 700 of a base station communications manager 715 that supports a wake up procedure using a pseudo-omni beam in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include data indicator 720, wakeup monitor 725, beam management controller 730, interference manager 735, beam recovery controller 740, retransmission controller 745, DRX manager 750, and encoder 755. Each of these modules may communicate, directly or indirectly, with one another (e.g., via one or more buses).

Data indicator 720 may identify that data is available to be transmitted to a UE that is operating in a DRX mode. In some cases, the wakeup message includes an indication that the data is available to be transmitted to the UE, and the beam management procedure is initiated based on the data being available.

Wakeup monitor 725 may transmit, based on identifying that the data is available to be transmitted to the UE, a wakeup message to the UE using a first transmit beam. In some cases, the wakeup message includes a PDCCH message having a lower code rate than a different UE-specific PDCCH message. In some cases, transmitting the wakeup message using the first transmit beam includes: transmitting, using the first transmit beam, a set of instances of the wakeup message over a set of symbol periods. In some cases, the wakeup message is configured with a predetermined DCI format, the predetermined DCI format indicating that the data is available to be transmitted to the UE. In some cases, the predetermined DCI format indicates a configuration for a set of beam management transmissions to the UE using a set of transmit beams during the beam management procedure, each transmit beam of the set of transmit beams being transmitted in a different direction and having a narrower beam width than the first transmit beam. In some cases, the configuration for the set of beam management transmissions includes an indication of resources to be used for the set of beam management transmissions. In some cases, the DCI format includes at least one bit indicating that the data is available to be transmitted to the UE and at least one bit indicating a configuration for a beam management procedure. In some cases, the first transmit beam includes a beamformed waveform having a predetermined beam width.

Beam management controller 730 may initiate a beam management procedure based on identifying that the data is available to be transmitted to the UE, to identify a second transmit beam for the base station to use to transmit the available data to the UE, where the transmit beam includes a narrower beam width than the first transmit beam. In some cases, the beam management procedure includes transmitting a set of beam management transmissions to the UE using a set of transmit beams, each transmit beam of the set of transmit beams being transmitted in a different direction and having a narrower beam width than the first transmit beam. In some cases, the beam management transmission includes a CSI-RS, or a SS, or a combination thereof. In some cases, the SS includes a PSS, or a SSS, or a DMRS, or a combination thereof. In some cases, the first transmit beam is a pseudo-omni transmit beam and the second transmit beam has a narrower beam width than the first transmit beam. In some cases, the first transmit beam and the second transmit beams are different transmit beams.

Interference manager 735 may configure the wakeup message to be received by the UE at an interference level higher than a different UE-specific control message received at the UE.

Beam recovery controller 740 may receive, based on the beam management procedure, a signal from the UE and transmit, based on the signal, the identified data to the UE using a transmit beam identified in the signal, the transmit beam including at least one transmit beam from a set of transmit beams transmitted to the UE in different directions during the beam management procedure, the transmit beam having a narrower beam width than the first transmit beam.

Retransmission controller 745 may identify that a response to the transmitted wakeup message has not been received from the UE and retransmit, based on the identification, the wakeup message to the UE using the first transmit beam.

DRX manager 750 may identify that a response to the transmitted wakeup message has not been received from the UE and transmit, based on the identification, a command to the UE to terminate an active state.

Encoder 755 may encode the wakeup message using a UE identifier. In some cases, the UE identifier includes at least a portion of a cell radio network temporary identifier (C-RNTI).

Figure 8:
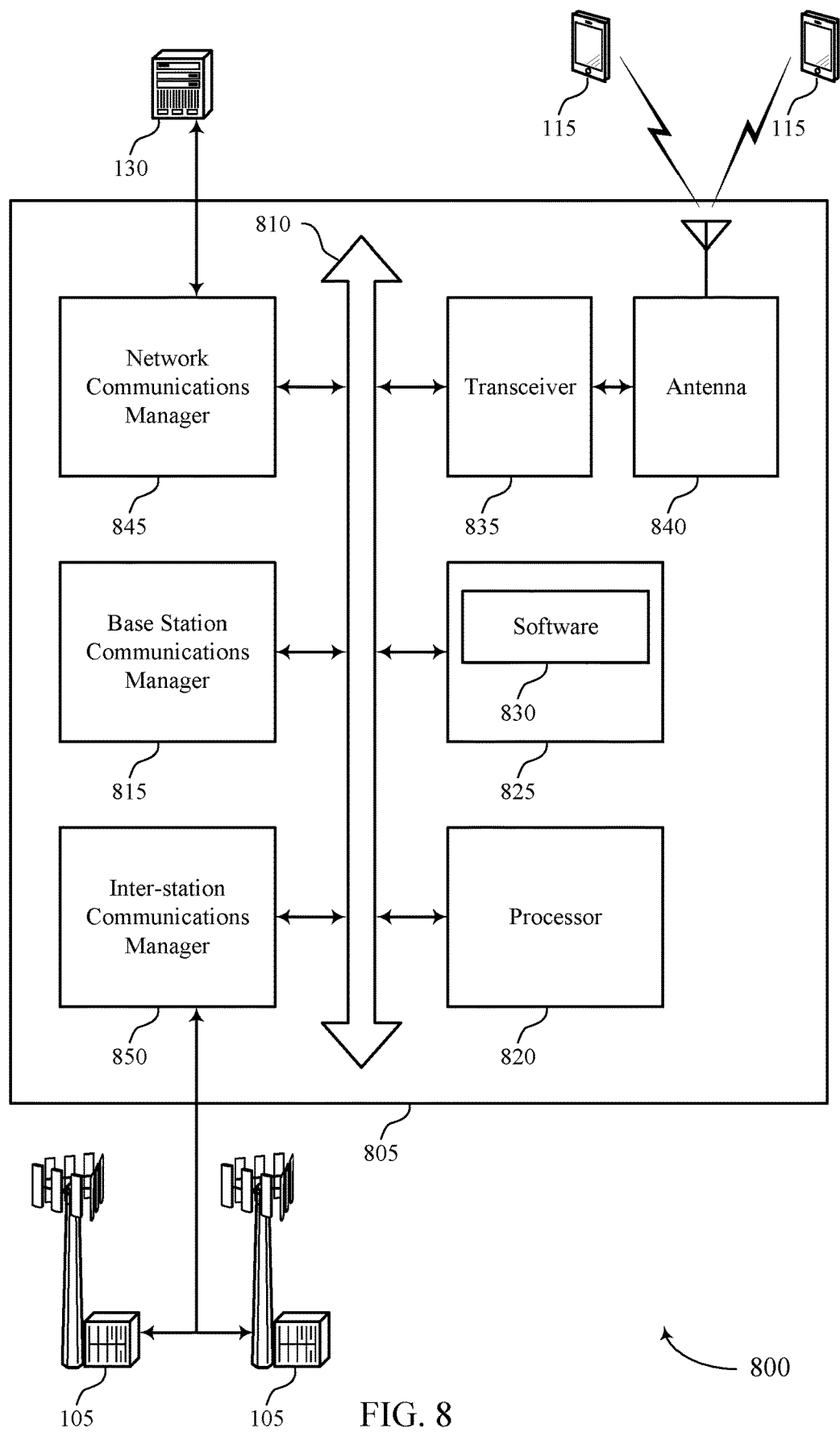
FIG. 8 illustrates a block diagram of a system including a base station that supports a wake up procedure using a pseudo-omni beam in accordance with aspects of the present disclosure.

FIG. 8 shows a diagram of a system 800 including a device 805 that supports a wake up procedure using a first beam in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting a wake up procedure using a pseudo-omni beam).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support a wake up procedure using a pseudo-omni beam. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
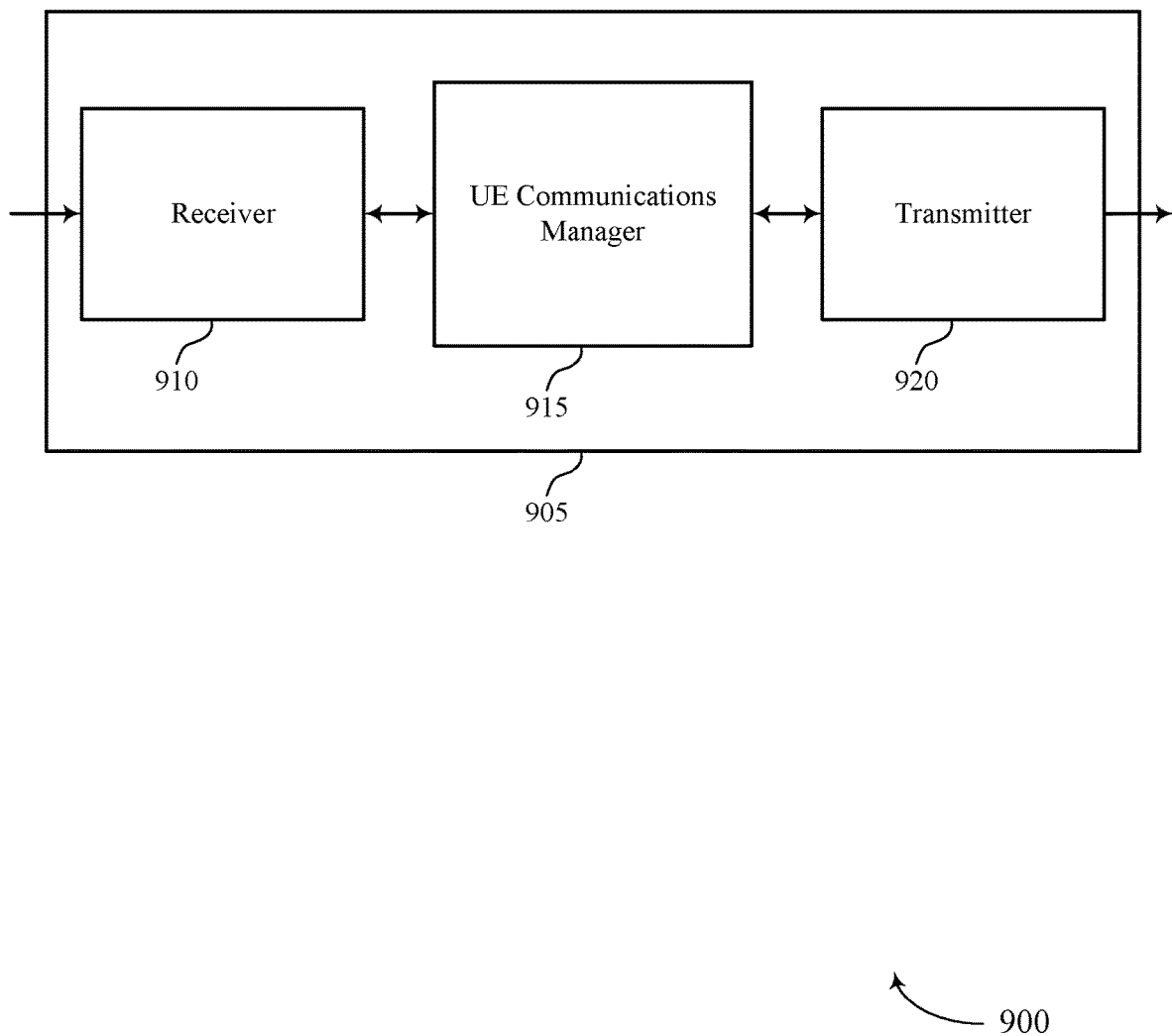
FIGS. 9 through 11 show block diagrams of a device that supports a wake up procedure using a pseudo-omni beam in accordance with aspects of the present disclosure.

FIG. 9 shows a block diagram 900 of a wireless device 905 that supports a wake up procedure using a pseudo-omni beam in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to a wake up procedure using a pseudo-omni beam, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, while operating in a DRX mode, a wakeup message from a base station, the wakeup message transmitted using a first transmit beam and indicating that data is available to be transmitted to the UE, receive, based on the indication that data is available to be transmitted to the UE, a second set of signals during a beam management procedure, the second set of signals transmitted using a second set of transmit beams, and transmit, based on the beam management procedure, a signal to the base station. The UE communications manager 915 may also receive, while operating in an on duration of a DRX mode, a wakeup message from a base station, the wakeup message transmitted using a first transmit beam and indicating whether data is available to be transmitted to the UE, maintain the on duration of the DRX mode when the wakeup message indicates that data is available to be transmitted to the UE, and transition to a sleep state of the DRX mode when the wakeup message does not indicate that data is available to be transmitted to the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
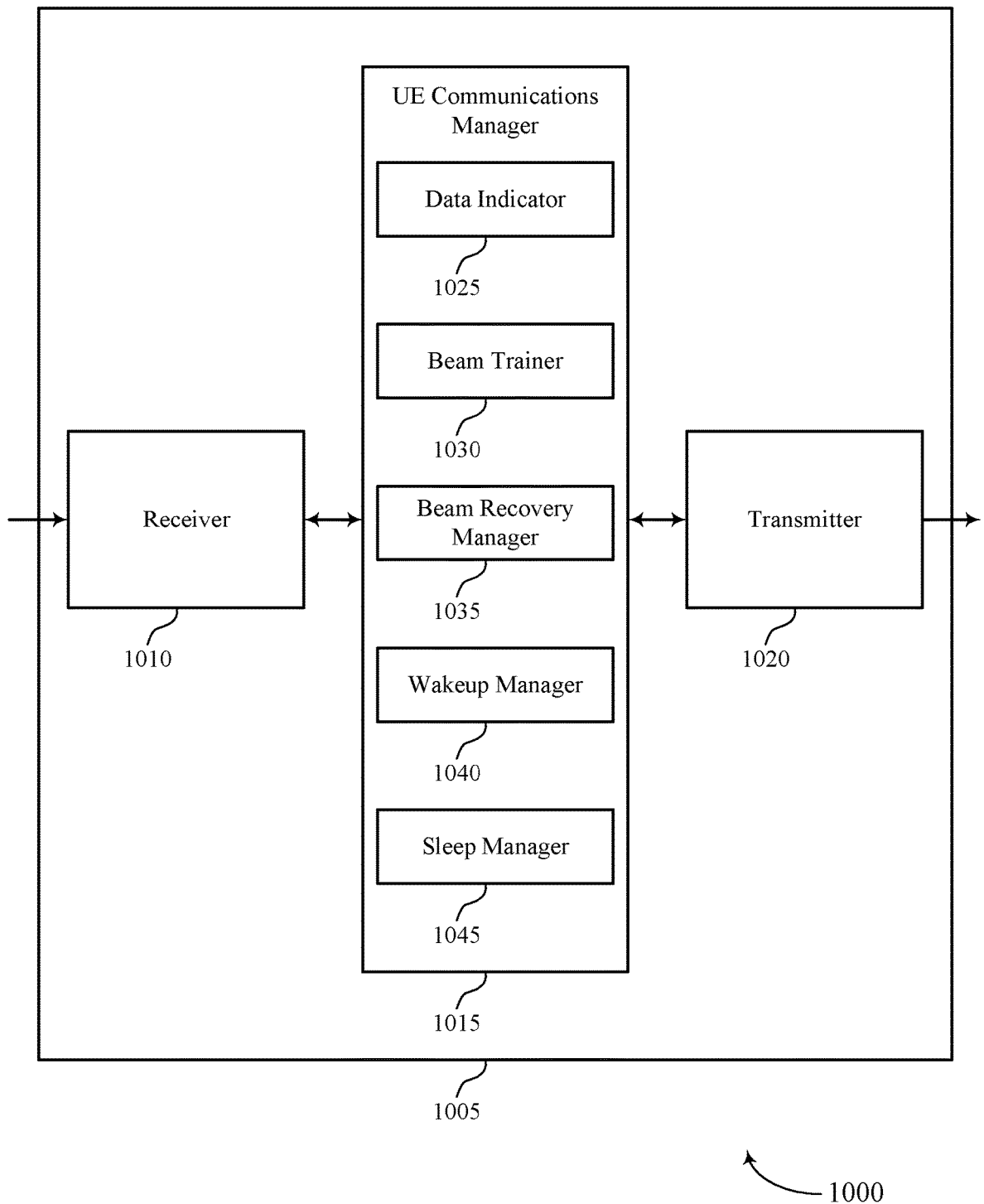

FIG. 10 shows a block diagram 1000 of a wireless device 1005 that supports a wake up procedure using a pseudo-omni beam in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to a wake up procedure using a pseudo-omni beam, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include data indicator 1025, beam trainer 1030, beam recovery manager 1035, wakeup manager 1040, and sleep manager 1045.

Data indicator 1025 may receive, while operating in a DRX mode, a wakeup message from a base station, the wakeup message transmitted using a first transmit beam and indicating that data is available to be transmitted to the UE, cycle through a set of available receive beam configurations during the set of symbol periods to identify the receive beam configuration, and receive, while operating in an on duration of a DRX mode, a wakeup message from a base station, the wakeup message transmitted using a first transmit beam and indicating whether data is available to be transmitted to the UE. In some cases, the wakeup message includes a PDCCH message. In some cases, receiving the wakeup message includes: receiving a set of instances of the wakeup message over a set of symbol periods. In some cases, the wakeup message is configured with a predetermined DCI format, the predetermined DCI format indicating that the data is available to be transmitted to the UE. In some cases, the predetermined DCI format indicates a configuration for a set of beam management transmissions to the UE using a set of transmit beams during the beam management procedure, each transmit beam of the set of transmit beams being transmitted in a different direction and having a narrower beam width than the first transmit beam. In some cases, the configuration for the set of beam management transmissions includes an indication of resources to be used for the set of beam management transmissions. In some cases, the DCI format includes at least one bit indicating that the data is available to be transmitted to the UE and at least one bit indicating a configuration for a beam management procedure. In some cases, the first transmit beam includes a beamformed waveform having a predetermined beam width.

Beam trainer 1030 may receive, based on the indication that data is available to be transmitted to the UE, procedure second set of signals during a beam management procedure, the second set of signals transmitted using a second set of transmit beams, each transmit beam of the second set of transmit beams being transmitted in a different direction and having a narrower beam width than the first transmit beam, and transmit, based on the received beam management transmission, a signal to the base station. In some cases, the first transmit beam is a pseudo-omni transmit beam and the second set of transmit beams are transmit beams having a narrower beam width than the first transmit beam. In some cases, the first transmit beam and the second set of transmit beams are different transmit beams. In some cases, the signal transmitted to the base station is a beam recovery signal. In some cases, the signal transmitted to the base station includes an indication of a beam index, the beam index based at least in part on the beam management procedure.

Beam recovery manager 1035 may transmit, based on the received beam management transmission, a signal to the base station.

Wakeup manager 1040 may receive, while operating in the DRX mode, a subsequent wakeup message from the base station; maintain the on duration of the DRX mode when the wakeup message indicates that data is available to be transmitted to the UE.

Sleep manager 1045 may transition to a sleep state of the DRX mode when the subsequent wakeup message does not indicate that data is available to be transmitted to the UE, initiate, based on the wakeup message indicating that data is available to be transmitted to the UE, an activity timer associated with the on duration of the DRX mode, and transition to the sleep state of the DRX mode when the activity timer expires before receiving at least one beam management transmission transmitted from the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
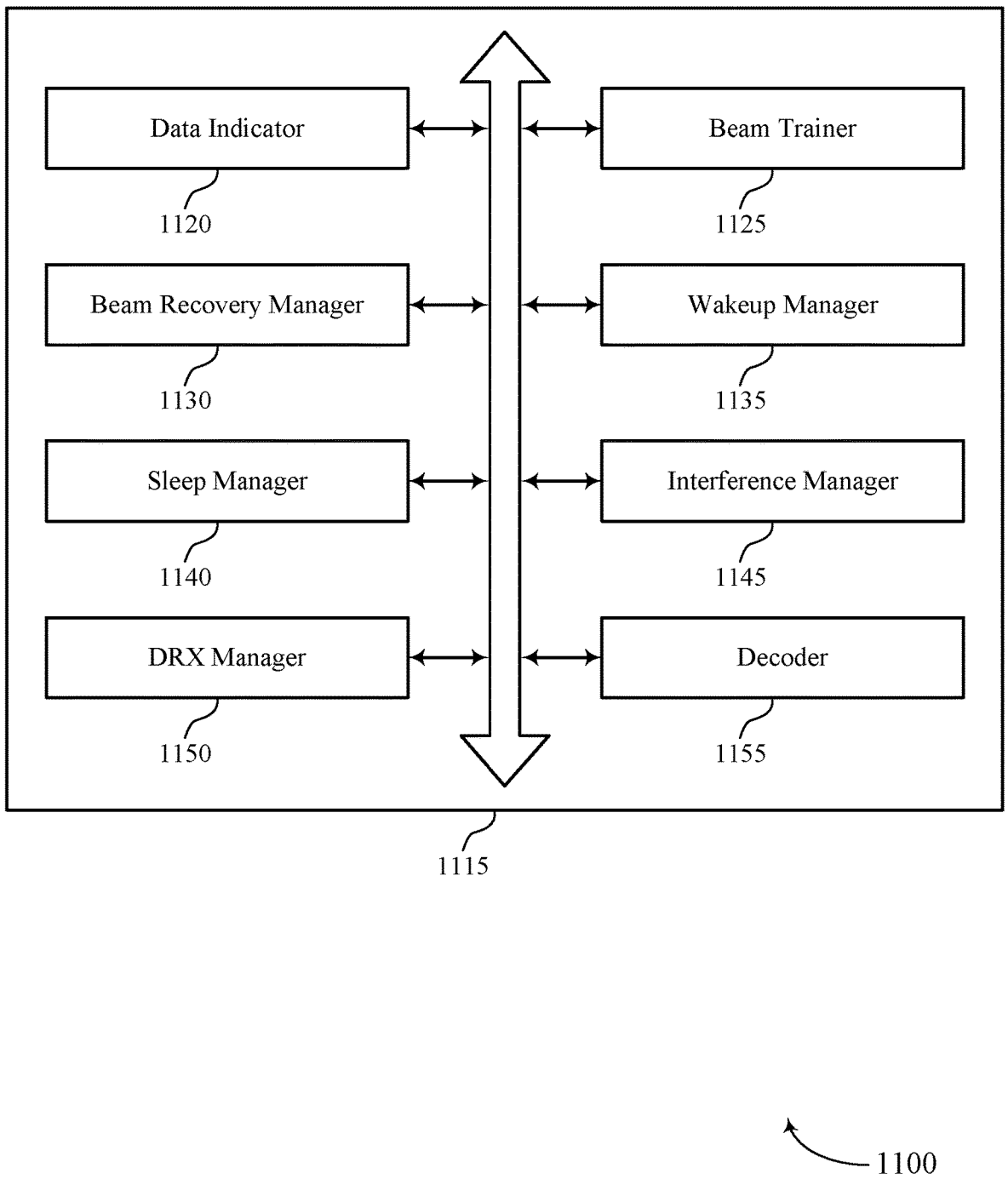

FIG. 11 shows a block diagram 1100 of a UE communications manager 1115 that supports a wake up procedure using a pseudo-omni beam in accordance with aspects of the present disclosure. The UE communications manager 1115 may be an example of aspects of a UE communications manager 1215 described with reference to FIGS. 9, 10, and 12. The UE communications manager 1115 may include data indicator 1120, beam trainer 1125, beam recovery manager 1130, wakeup manager 1135, sleep manager 1140, interference manager 1145, DRX manager 1150, and decoder 1155. Each of these modules may communicate, directly or indirectly, with one another (e.g., via one or more buses).

Data indicator 1120 may receive, while operating in a DRX mode, a wakeup message from a base station, the wakeup message transmitted using a first transmit beam and indicating that data is available to be transmitted to the UE, cycle through a set of available receive beam configurations during the set of symbol periods to identify the receive beam configuration, and receive, while operating in an on duration of a DRX mode, a wakeup message from a base station, the wakeup message transmitted using a first transmit beam and indicating whether data is available to be transmitted to the UE. In some cases, the wakeup message includes a PDCCH message. In some cases, receiving the wakeup message includes: receiving a set of instances of the wakeup message over a set of symbol periods. In some cases, the wakeup message is configured with a predetermined DCI format, the predetermined DCI format indicating that the data is available to be transmitted to the UE. In some cases, the predetermined DCI format indicates a configuration for a set of beam management transmissions to the UE using a set of transmit beams during the beam management procedure, each transmit beam of the set of transmit beams being transmitted in a different direction and having a narrower beam width than the first transmit beam. In some cases, the configuration for the set of beam management transmissions includes an indication of resources to be used for the set of beam management transmissions. In some cases, the DCI format includes at least one bit indicating that the data is available to be transmitted to the UE and at least one bit indicating a configuration for a beam management procedure. In some cases, the first transmit beam includes a beamformed waveform having a predetermined beam width.

Beam trainer 1125 may receive, based on the indication that data is available to be transmitted to the UE, procedure second set of signals during a beam management procedure, the second set of signals transmitted using a second set of transmit beams, each transmit beam of the second set of transmit beams being transmitted in a different direction and having a narrower beam width than the first transmit beam, and transmit, based on the beam management procedure, a signal to the base station. In some cases, the first transmit beam is a pseudo-omni transmit beam and the second set of transmit beams are transmit beams having a narrower beam width than the first transmit beam. In some cases, the first transmit beam and the second set of transmit beams are different transmit beams. In some cases, the signal transmitted to the base station is a beam recovery signal. In some cases, the signal transmitted to the base station includes an indication of a beam index, the beam index based at least in part on the beam management procedure.

Beam recovery manager 1130 may transmit, based on the beam management procedure, a signal to the base station.

Wakeup manager 1135 may receive, while operating in the DRX mode, a subsequent wakeup message from the base station and maintain the on duration of the DRX mode when the subsequent wakeup message indicates that data is available to be transmitted to the UE.

Sleep manager 1140 may transition to a sleep state of the DRX mode when the subsequent wakeup message does not indicate that data is available to be transmitted to the UE, initiate, based on the wakeup message indicating that data is available to be transmitted to the UE, an activity timer associated with the on duration of the DRX mode, and transition to the sleep state of the DRX mode when the activity timer expires before receiving at least one beam management transmission transmitted from the base station.

Interference manager 1145 may receive the wakeup message from the base station at an interference level higher than a different UE-specific control message received at the UE.

DRX manager 1150 may receive the wakeup message while the UE is in an on duration of the DRX mode, remain in the on duration if the wakeup message indicates that data is available for the UE, and transition to a sleep state of the DRX mode if the wakeup message does not indicate that data is available for the UE.

Decoder 1155 may decode the wakeup message using a UE identifier. In some cases, the UE identifier includes at least a portion of a cell radio network temporary identifier (C-RNTI).

Figure 12:
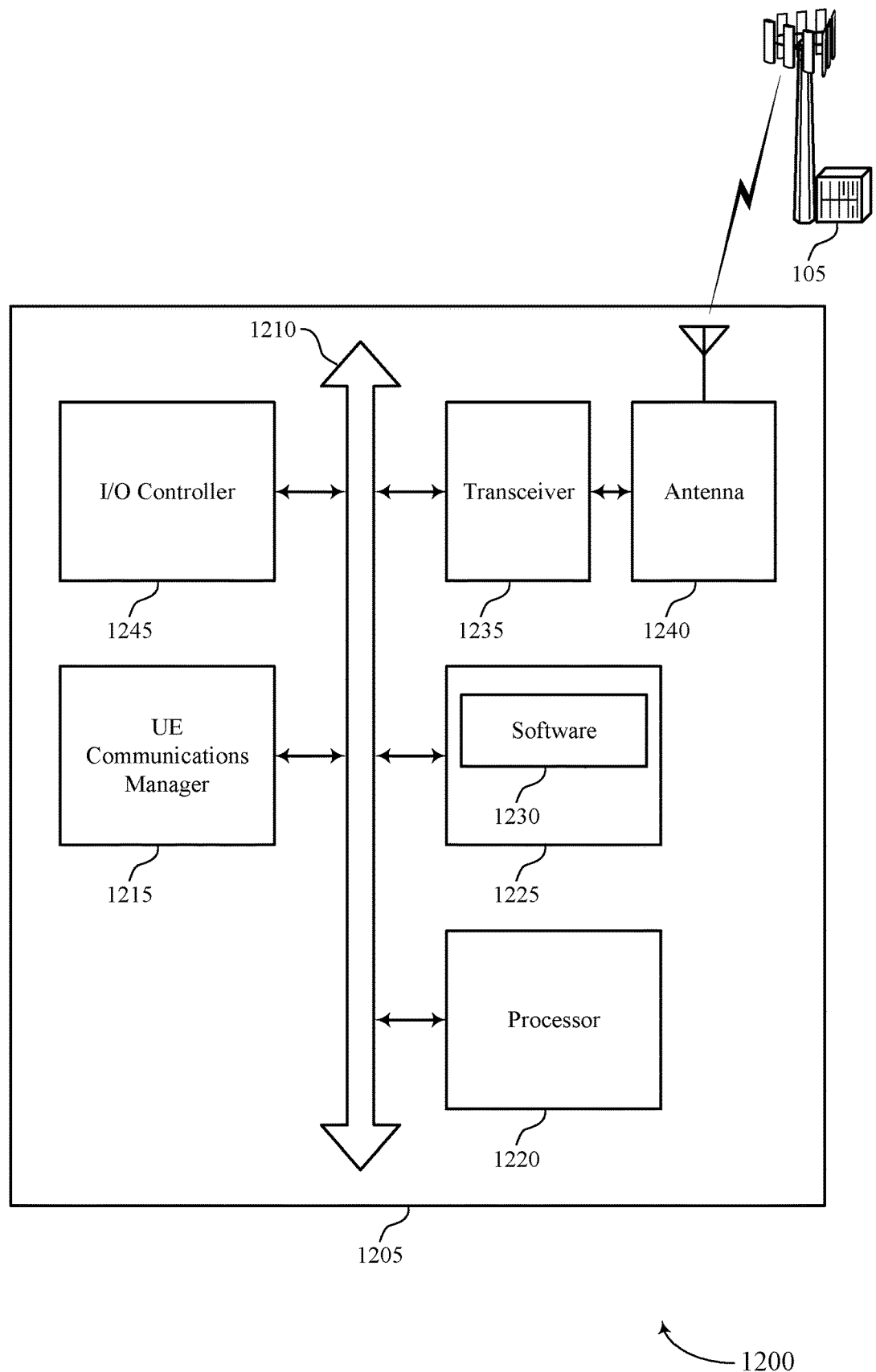
FIG. 12 illustrates a block diagram of a system including a UE that supports a wake up procedure using a pseudo-omni beam in accordance with aspects of the present disclosure.

FIG. 12 shows a diagram of a system 1200 including a device 1205 that supports a wake up procedure using a pseudo-omni beam in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220.

Processor 1220 may be configured to execute computer-readable instructions stored in a memory to perform various functions (e.g., functions or tasks supporting a wake up procedure using a pseudo-omni beam).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support a wake up procedure using a pseudo-omni beam. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
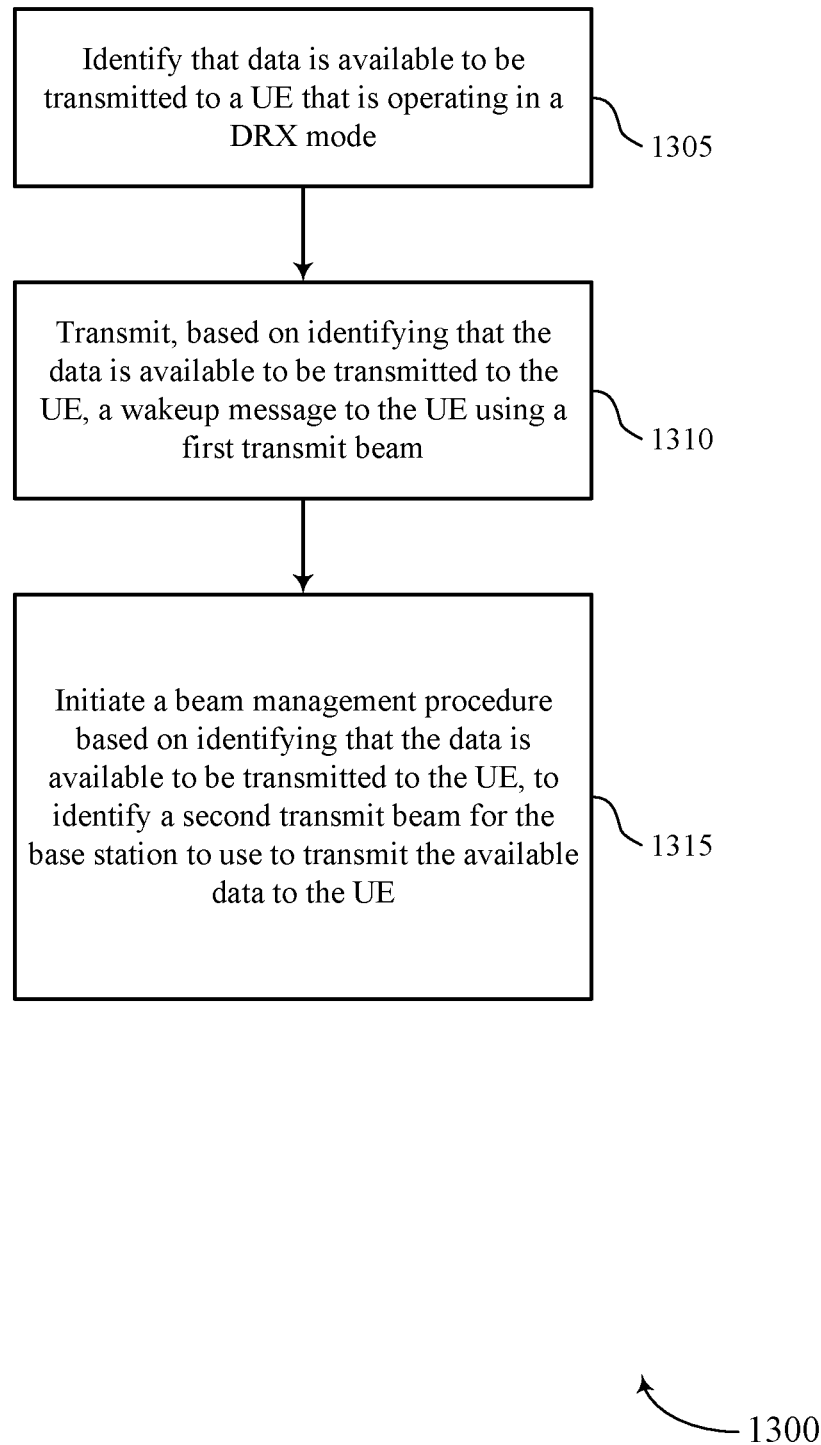
FIGS. 13 through 18 illustrate methods for a wake up procedure using a pseudo-omni beam in accordance with aspects of the present disclosure.

FIG. 13 shows a flowchart illustrating a method 1300 for a wake up procedure using a pseudo-omni beam in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify that data is available to be transmitted to a UE that is operating in a DRX mode. The operations of block 1305 may be performed according to the methods described herein. In certain examples, aspects of the operations of block 1305 may be performed by a data indicator as described with reference to FIGS. 5 through 8.

At block 1310 the base station 105 may transmit, based at least in part on identifying that the data is available to be transmitted to the UE, a wakeup message to the UE using a first transmit beam. The operations of block 1310 may be performed according to the methods described herein. In certain examples, aspects of the operations of block 1310 may be performed by a wakeup monitor as described with reference to FIGS. 5 through 8.

At block 1315 the base station 105 may initiate a beam management procedure based at least in part on identifying that the data is available to be transmitted to the UE, to identify a second transmit beam for the base station to use to transmit the available data to the UE. The operations of block 1315 may be performed according to the methods described herein. In certain examples, aspects of the operations of block 1315 may be performed by a beam management controller as described with reference to FIGS. 5 through 8.

Figure 14:
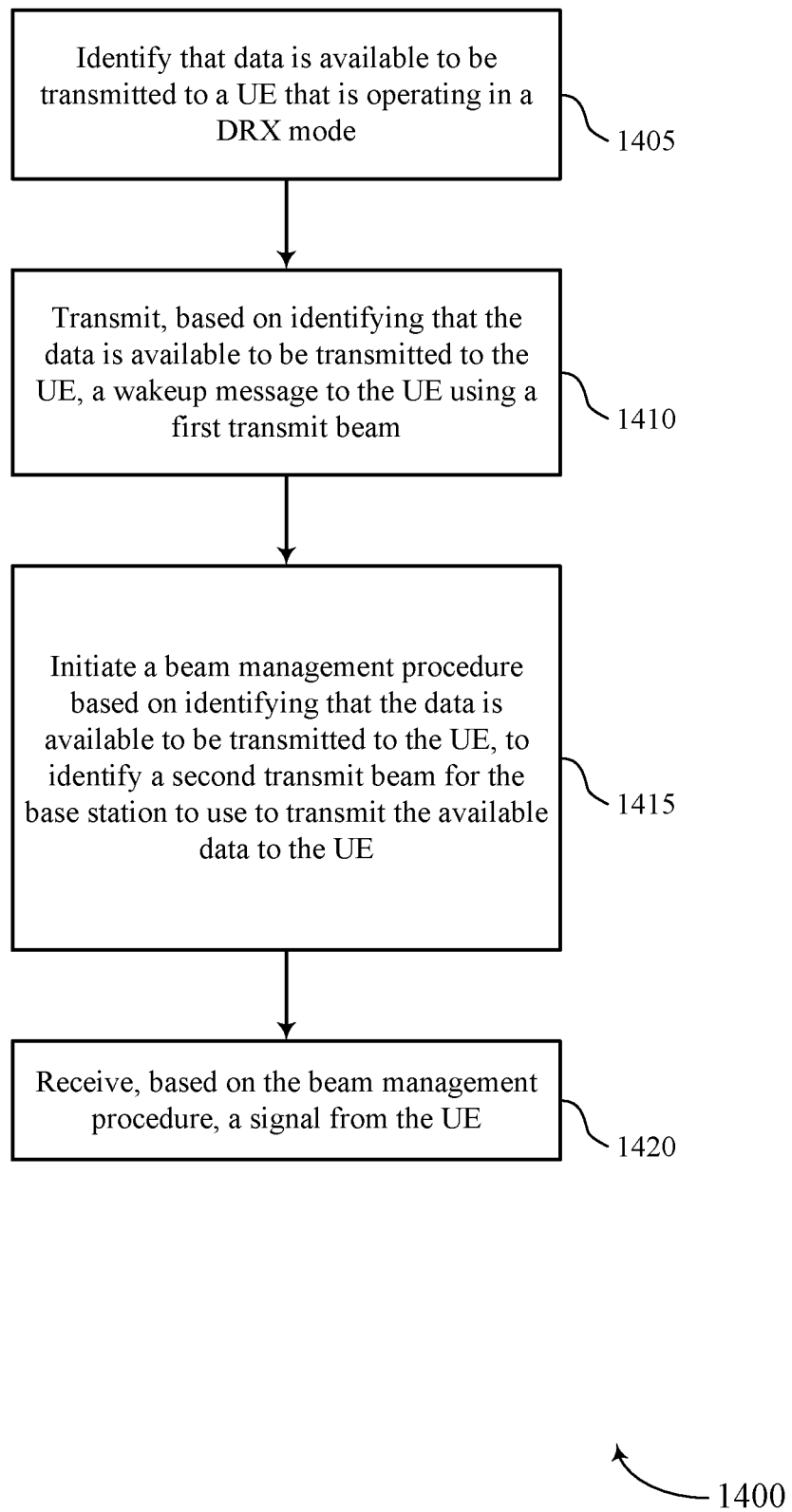

FIG. 14 shows a flowchart illustrating a method 1400 for a wake up procedure using a pseudo-omni beam in accordance with aspects of the present disclosure. The operations of method 1400 may be implemented by a base station 105 or its components as described herein. For example, the operations of method 1400 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify that data is available to be transmitted to a UE that is operating in a DRX mode. The operations of block 1405 may be performed according to the methods described herein. In certain examples, aspects of the operations of block 1405 may be performed by a data indicator as described with reference to FIGS. 5 through 8.

At block 1410 the base station 105 may transmit, based at least in part on identifying that the data is available to be transmitted to the UE, a wakeup message to the UE using a first transmit beam. The operations of block 1410 may be performed according to the methods described herein. In certain examples, aspects of the operations of block 1410 may be performed by a wakeup monitor as described with reference to FIGS. 5 through 8.

At block 1415 the base station 105 may initiate a beam management procedure based at least in part on identifying that the data is available to be transmitted to the UE, to identify a second transmit beam for the base station to use to transmit the available data to the UE. The operations of block 1415 may be performed according to the methods described herein. In certain examples, aspects of the operations of block 1415 may be performed by a beam management controller as described with reference to FIGS. 5 through 8.

At block 1420 the base station 105 may receive, based at least in part on the beam management procedure, a signal from the UE. The operations of block 1420 may be performed according to the methods described herein. In certain examples, aspects of the operations of block 1420 may be performed by a beam recovery controller as described with reference to FIGS. 5 through 8.

Figure 15:
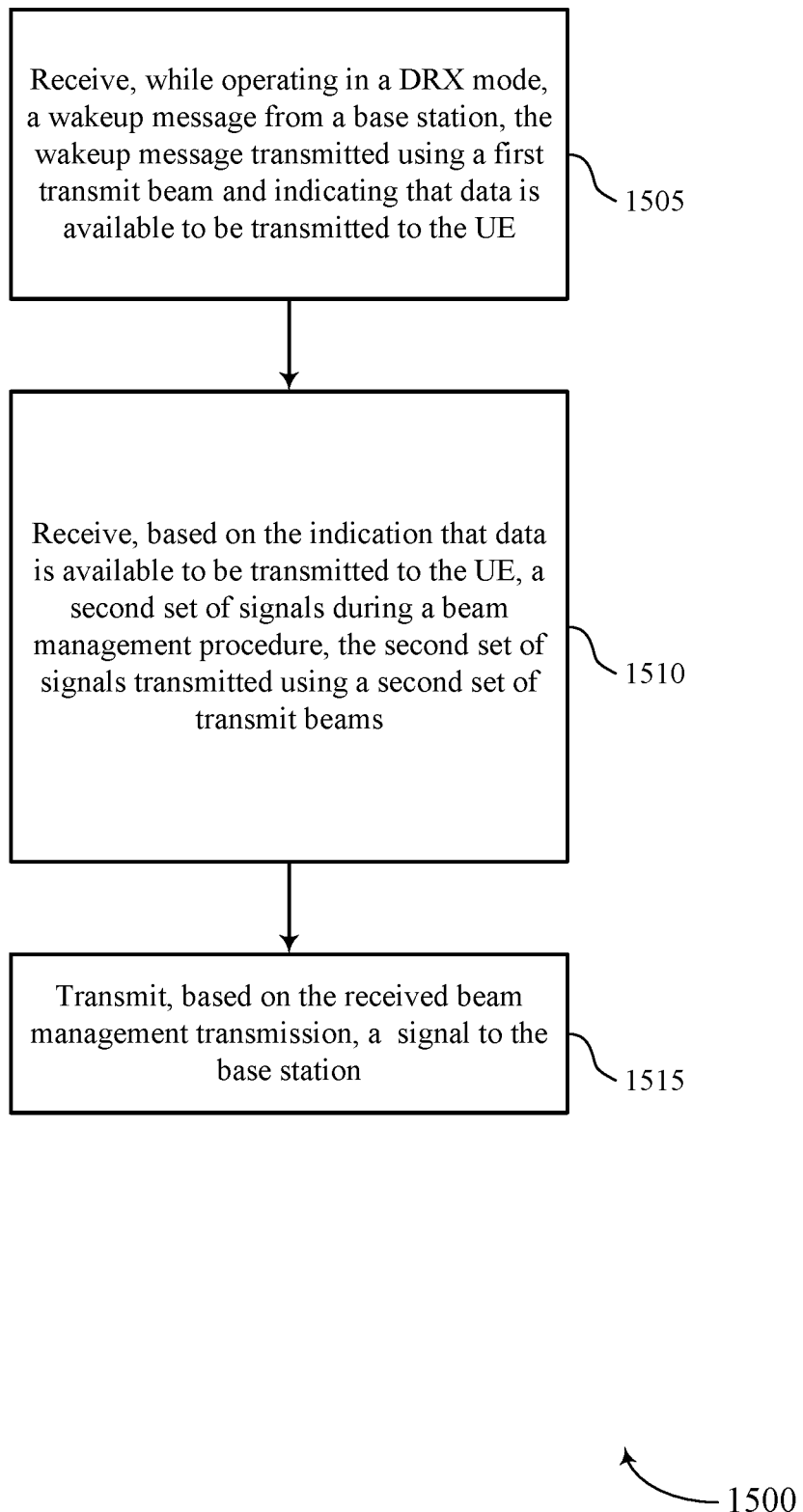

FIG. 15 shows a flowchart illustrating a method 1500 for a wake up procedure using a pseudo-omni beam in accordance with aspects of the present disclosure. The operations of method 1500 may be implemented by a UE 115 or its components as described herein. For example, the operations of method 1500 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, while operating in a DRX mode, a wakeup message from a base station, the wakeup message transmitted using a first transmit beam and indicating that data is available to be transmitted to the UE. The operations of block 1505 may be performed according to the methods described herein. In certain examples, aspects of the operations of block 1505 may be performed by a data indicator as described with reference to FIGS. 9 through 12.

At block 1510 the UE 115 may receive, based at least in part on the indication that data is available to be transmitted to the UE, a second set of signals during a beam management procedure, the second set of signals transmitted using a second set of transmit beams. The operations of block 1510 may be performed according to the methods described herein. In certain examples, aspects of the operations of block 1510 may be performed by a beam trainer as described with reference to FIGS. 9 through 12.

At block 1515 the UE 115 may transmit, based at least in part on the received beam management transmission, a signal to the base station. The operations of block 1515 may be performed according to the methods described herein. In certain examples, aspects of the operations of block 1515 may be performed by a beam recovery manager as described with reference to FIGS. 9 through 12.

Figure 16:
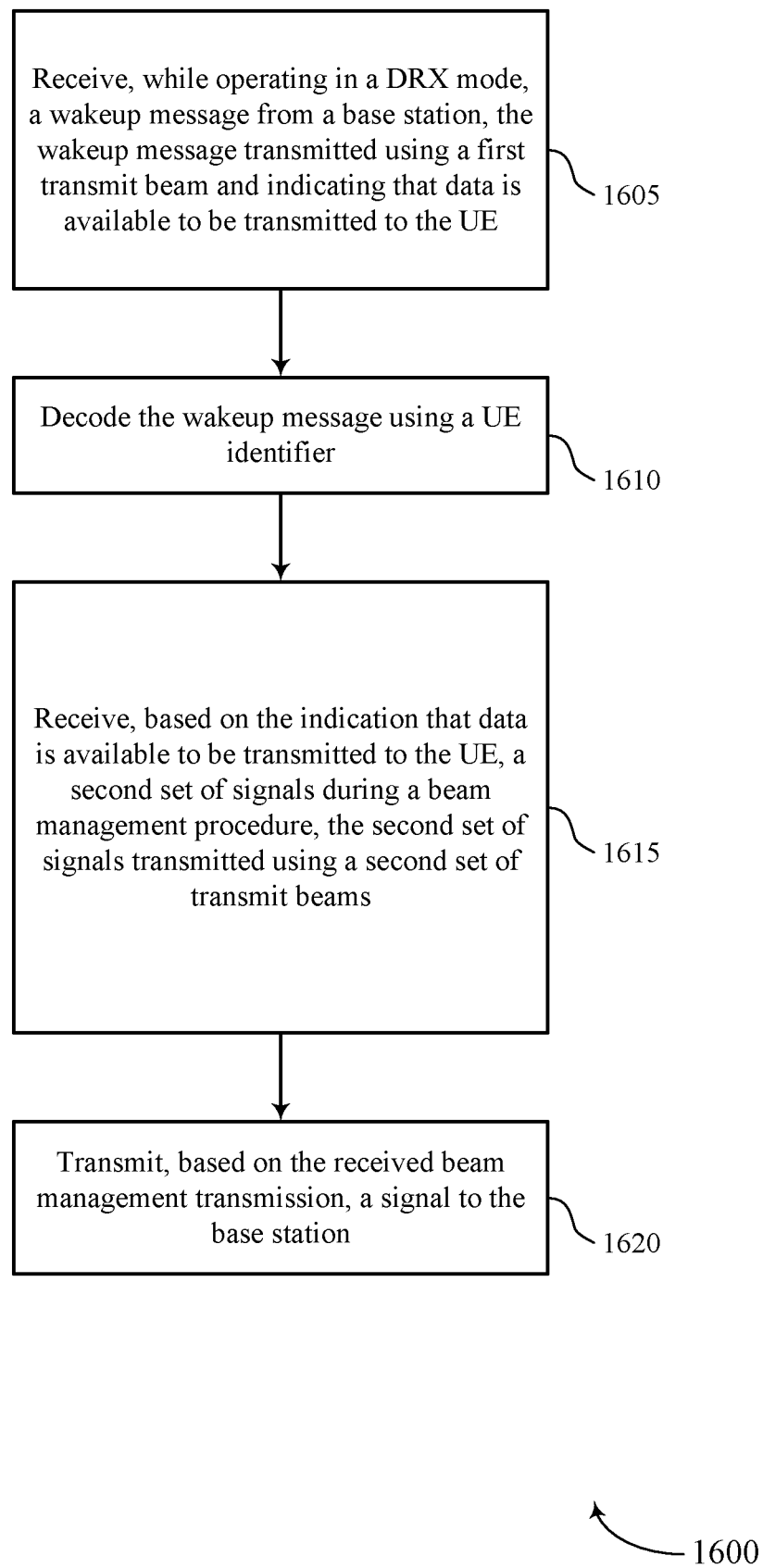

FIG. 16 shows a flowchart illustrating a method 1600 for a wake up procedure using a first beam in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, while operating in a DRX mode, a wakeup message from a base station, the wakeup message transmitted using a first transmit beam and indicating that data is available to be transmitted to the UE. The operations of block 1605 may be performed according to the methods described herein. In certain examples, aspects of the operations of block 1605 may be performed by a data indicator as described with reference to FIGS. 9 through 12.

At block 1610 the UE 115 may decode the wakeup message using a UE identifier. The operations of block 1610 may be performed according to the methods described herein. In certain examples, aspects of the operations of block 1610 may be performed by a decoder as described with reference to FIGS. 9 through 12.

At block 1615 the UE 115 may receive, based at least in part on the indication that data is available to be transmitted to the UE, a second set of signals during a beam management procedure, the second set of signals transmitted using a second set of transmit beams. The operations of block 1615 may be performed according to the methods described herein. In certain examples, aspects of the operations of block 1615 may be performed by a beam trainer as described with reference to FIGS. 9 through 12.

At block 1620 the UE 115 may transmit, based at least in part on the received beam management transmission, a signal to the base station. The operations of block 1620 may be performed according to the methods described herein. In certain examples, aspects of the operations of block 1620 may be performed by a beam recovery manager as described with reference to FIGS. 9 through 12.

Figure 17:
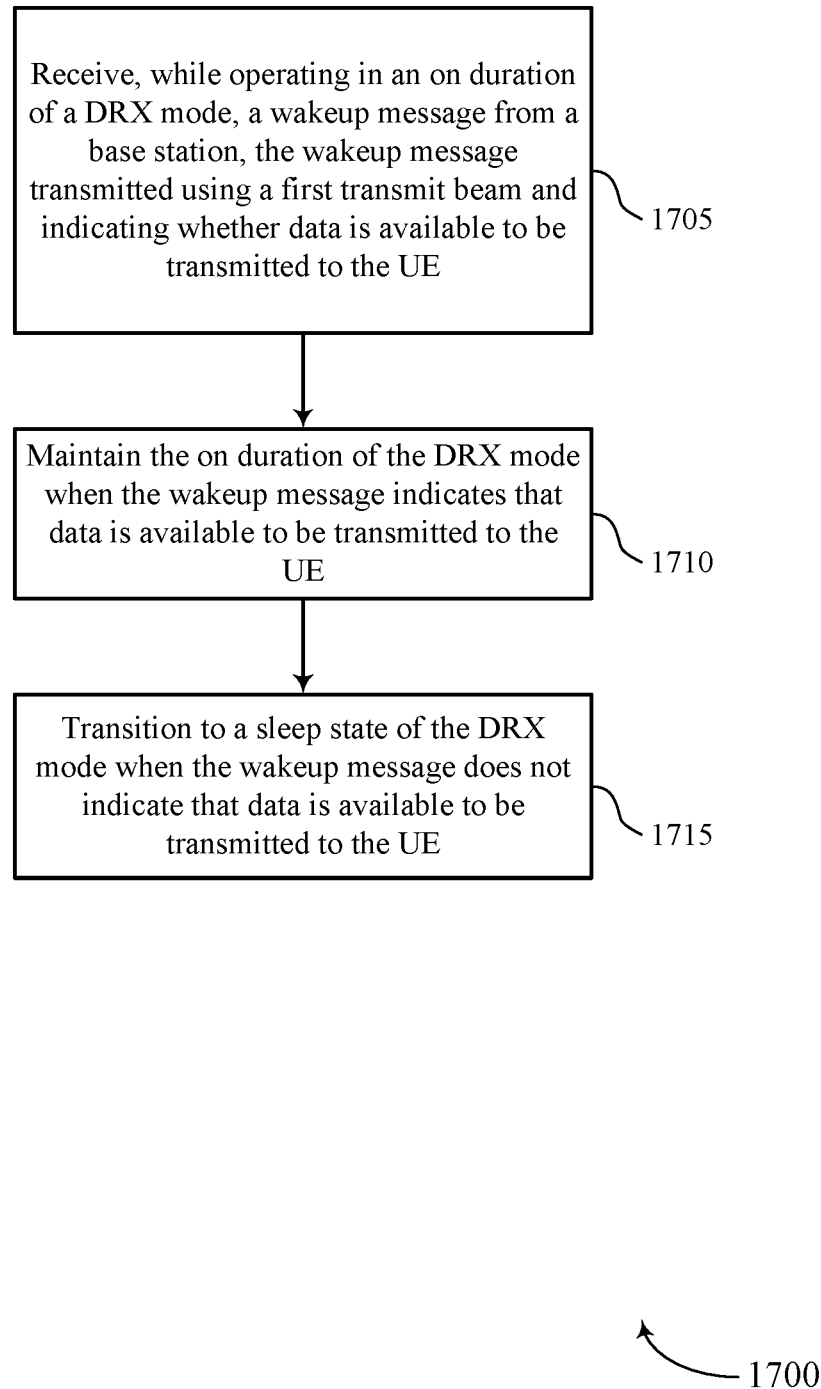

FIG. 17 shows a flowchart illustrating a method 1700 for a wake up procedure using a pseudo-omni beam in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, while operating in an on duration of a DRX mode, a wakeup message from a base station, the wakeup message transmitted using a first transmit beam and indicating whether data is available to be transmitted to the UE. The operations of block 1705 may be performed according to the methods described herein. In certain examples, aspects of the operations of block 1705 may be performed by a data indicator as described with reference to FIGS. 9 through 12.

At block 1710 the UE 115 may maintain the on duration of the DRX mode when the wakeup message indicates that data is available to be transmitted to the UE. The operations of block 1710 may be performed according to the methods described herein. In certain examples, aspects of the operations of block 1710 may be performed by a wakeup manager as described with reference to FIGS. 9 through 12.

At block 1715 the UE 115 may transition to a sleep state of the DRX mode when the wakeup message does not indicate that data is available to be transmitted to the UE. The operations of block 1715 may be performed according to the methods described herein. In certain examples, aspects of the operations of block 1715 may be performed by a sleep manager as described with reference to FIGS. 9 through 12.

Figure 18:
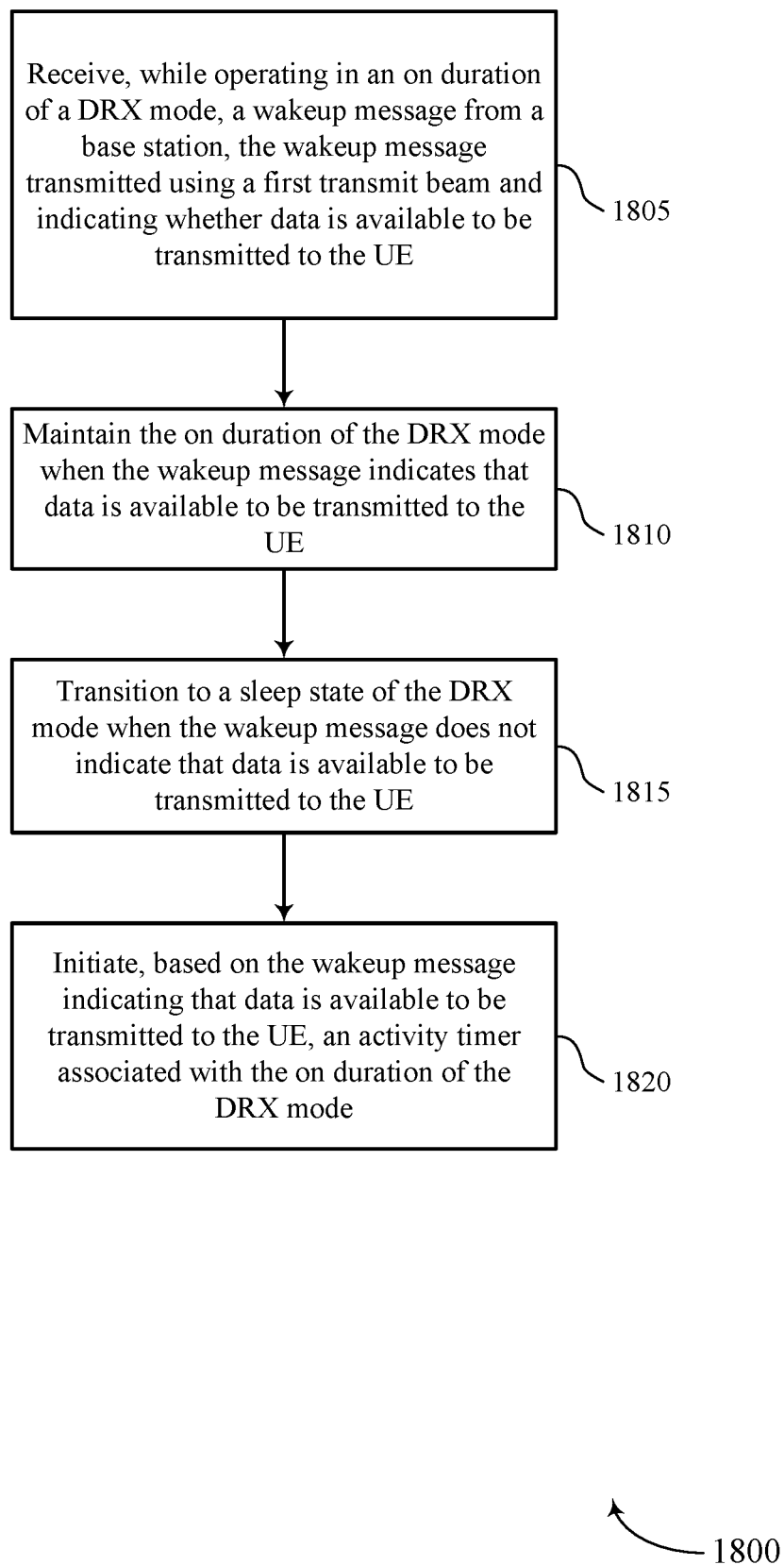

FIG. 18 shows a flowchart illustrating a method 1800 for a wake up procedure using a pseudo-omni beam in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, while operating in an on duration of a DRX mode, a wakeup message from a base station, the wakeup message transmitted using a first transmit beam and indicating whether data is available to be transmitted to the UE. The operations of block 1805 may be performed according to the methods described herein. In certain examples, aspects of the operations of block 1805 may be performed by a data indicator as described with reference to FIGS. 9 through 12.

At block 1810 the UE 115 may maintain the on duration of the DRX mode when the wakeup message indicates that data is available to be transmitted to the UE. The operations of block 1810 may be performed according to the methods described herein. In certain examples, aspects of the operations of block 1810 may be performed by a wakeup manager as described with reference to FIGS. 9 through 12.

At block 1815 the UE 115 may transition to a sleep state of the DRX mode when the wakeup message does not indicate that data is available to be transmitted to the UE. The operations of block 1815 may be performed according to the methods described herein. In certain examples, aspects of the operations of block 1815 may be performed by a sleep manager as described with reference to FIGS. 9 through 12.

At block 1820 the UE 115 may initiate, based at least in part on the wakeup message indicating that data is available to be transmitted to the UE, an activity timer associated with the on duration of the DRX mode. The operations of block 1820 may be performed according to the methods described herein. In certain examples, aspects of the operations of block 1820 may be performed by a sleep manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
    identifying that data is available to be transmitted to a user equipment (UE) that is operating in a discontinuous reception (DRX) mode;
    transmitting, based at least in part on identifying that the data is available to be transmitted to the UE, a wakeup message to the UE using a first transmit beam; and
    initiating a beam management procedure based at least in part on identifying that the data is available to be transmitted to the UE, to identify a second transmit beam for the base station to use to transmit the available data to the UE.

2. The method of claim 1, wherein the first transmit beam comprises a pseudo-omni transmit beam and the second transmit beam comprises a narrower beam width than the first transmit beam.

3. The method of claim 1, wherein the first transmit beam and the second transmit beam are different transmit beams.

4. The method of claim 1, wherein the wakeup message comprises an indication that the data is available to be transmitted to the UE, and the beam management procedure is initiated based on the data being available.

5. The method of claim 1, wherein the beam management procedure comprises transmitting a set of beam management transmissions to the UE using a set of transmit beams, each transmit beam of the set of transmit beams being transmitted in a different direction and having a narrower beam width than the first transmit beam.

6. The method of claim 1, wherein the wakeup message comprises a physical downlink control channel (PDCCH) message having a lower code rate than a different UE-specific PDCCH message.

7. The method of claim 1, wherein transmitting the wakeup message using the first transmit beam comprises:
    transmitting, using the first transmit beam, a plurality of instances of the wakeup message over a plurality of symbol periods.

8. The method of claim 7, further comprising:
    transmitting, based at least in part on a received beam recovery message from the UE, the identified data to the UE using a transmit beam identified in the beam recovery message, the transmit beam comprising at least one transmit beam from a set of transmit beams transmitted to the UE in different directions during the beam management procedure, the transmit beam having a narrower beam width than the first transmit beam.

9. The method of claim 1, further comprising:
    configuring the wakeup message to be received by the UE at an interference level higher than a different UE-specific control message received at the UE.

10. The method of claim 1, further comprising:
    receiving, based at least in part on the beam management procedure, a beam recovery message from the UE.

11. The method of claim 1, further comprising:
    identifying that a response to the transmitted wakeup message has not been received from the UE; and retransmitting, based at least in part on the identification, the wakeup message to the UE using the first transmit beam.

12. The method of claim 1, further comprising:
identifying that a response to the transmitted wakeup message has not been received from the UE; and
transmitting, based at least in part on the identification, a command to the UE to terminate an active state.

13. The method of claim 1, further comprising:
encoding the wakeup message using a UE identifier.

14. The method of claim 13, wherein the UE identifier comprises at least a portion of a cell radio network temporary identifier (C-RNTI).

15. The method of claim 1, wherein the wakeup message is configured with a predetermined downlink control information (DCI) format, the predetermined DCI format indicating that the data is available to be transmitted to the UE.

16. The method of claim 15, wherein the predetermined DCI format indicates a configuration for a plurality of beam management transmissions to the UE using a set of transmit beams during the beam management procedure, each transmit beam of the set of transmit beams being transmitted in a different direction and having a narrower beam width than the first transmit beam.

17. The method of claim 16, wherein the configuration for the set of beam management transmissions comprises an indication of resources to be used for the set of beam management transmissions.

18. The method of claim 15, wherein the DCI format comprises at least one bit indicating that the data is available to be transmitted to the UE and at least one bit indicating a configuration for a beam management procedure.

19. The method of claim 1, wherein the first transmit beam comprises a beamformed waveform having a predetermined beam width.

20. The method of claim 1, wherein the beam management transmission comprises a channel state information reference signal (CSI-RS), or a synchronization signal (SS), or a combination thereof.

21. The method of claim 1, wherein the wakeup message is transmitted in a physical downlink control channel (PDCCH) message using cyclic redundancy check (CRC) bits scrambled using an identifier of the UE.

22. A method for wireless communication at a user equipment (UE), comprising:
receiving, while operating in a discontinuous reception (DRX) mode, a wakeup message from a base station, the wakeup message transmitted using a first transmit beam and indicating that data is available to be transmitted to the UE;
receiving, based at least in part on the indication that data is available to be transmitted to the UE, a second set of signals during a beam management procedure, wherein the second set of signals are transmitted using a second set of transmit beams; and
transmitting, based at least in part on the beam management procedure, a signal to the base station.

23. The method of claim 22, wherein the first transmit beam comprises a pseudo-omni transmit beam and the second set of transmit beams comprise transmit beams having a narrower beam width than the first transmit beam.

24. The method of claim 22, wherein the wakeup message is received in a physical downlink control channel (PDCCH) message using cyclic redundancy check (CRC) bits scrambled using an identifier of the UE.

25. The method of claim 22, wherein the signal transmitted to the base station comprises a beam recovery signal.

26. The method of claim 22, wherein the signal transmitted to the base station comprises an indication of a beam index, the beam index based at least in part on the beam management procedure.

27. The method of claim 22, further comprising:
receiving, while operating in the DRX mode, a subsequent wakeup message from the base station;
maintaining an on duration of the DRX mode when the subsequent wakeup message indicates that data is available to be transmitted to the UE; and
transitioning to a sleep state of the DRX mode when the subsequent wakeup message does not indicate that data is available to be transmitted to the UE.

28. The method of claim 22, wherein the wakeup message comprises a physical downlink control channel (PDCCH) message.

29. An apparatus for wireless communication at a base station, comprising:
a processor,
memory in electronic communication with the processor; and
instructions stored in the memory and executable by the processor to cause the apparatus to:
identify that data is available to be transmitted to a user equipment (UE) that is operating in a discontinuous reception (DRX) mode;
transmit, based at least in part on identifying that the data is available to be transmitted to the UE, a wakeup message to the UE using a first transmit beam; and
initiate a beam management procedure based at least in part on identifying that the data is available to be transmitted to the UE, to identify a second transmit beam for the base station to use to transmit the available data to the UE.

30. An apparatus for wireless communication at a user equipment (UE), comprising:
a processor,
memory in electronic communication with the processor; and
instructions stored in the memory and executable by the processor to cause the apparatus to:
receive, while operating in a discontinuous reception (DRX) mode, a wakeup message from a base station, the wakeup message transmitted using a first transmit beam and indicating that data is available to be transmitted to the UE;
receive, based at least in part on the indication that data is available to be transmitted to the UE, a second set of signals during a beam management procedure, wherein the second set of signals are transmitted using a second set of transmit beams; and
transmit, based at least in part on the beam management procedure, a signal to the base station.

* * * * *